US012613378B2

(12) United States Patent
Hinata

(10) Patent No.: US 12,613,378 B2
(45) Date of Patent: Apr. 28, 2026

(54) OPTICAL CONNECTOR, OPTICAL CONNECTOR MODULE, AND METHOD FOR PRODUCING OPTICAL CONNECTOR

(71) Applicant: Enplas Corporation, Saitama (JP)

(72) Inventor: Ayano Hinata, Saitama (JP)

(73) Assignee: Enplas Corporation, Saitama (JP)

( * ) Notice: Subject to any disclaimer, the term of this patent is extended or adjusted under 35 U.S.C. 154(b) by 405 days.

(21) Appl. No.: 18/347,628

(22) Filed: Jul. 6, 2023

(65) Prior Publication Data

US 2024/0012205 A1      Jan. 11, 2024

(30) Foreign Application Priority Data

Jul. 8, 2022      (JP) ................................. 2022-110758

(51) Int. Cl.
G02B 6/38 (2006.01)

(52) U.S. Cl.
CPC ......... G02B 6/3825 (2013.01); G02B 6/3839 (2013.01); G02B 6/3843 (2013.01); G02B 6/3858 (2013.01); G02B 6/3861 (2013.01)

(58) Field of Classification Search
None
See application file for complete search history.

(56) References Cited

U.S. PATENT DOCUMENTS 4,657,341 A * 4/1987 Sammueller ......... G02B 6/3885
                                                      385/59
4,973,127 A * 11/1990 Cannon, Jr. .......... G02B 6/3885
                                                      29/418

11,726,268 B1 * 8/2023 Sukegawa ............ G02B 6/3885
                                                      385/83
2001/0036341 A1 * 11/2001 Ohtsuka ................... G02B 6/25
                                                      385/85
2005/0123248 A1 * 6/2005 Sakurai ................ G02B 6/3865
                                                      385/78
2008/0144999 A1 * 6/2008 Takeda ................. G02B 6/3861
                                                      385/51
2011/0262083 A1 * 10/2011 Tamura ................ G02B 6/4239
                                                      385/93
2012/0257860 A1 * 10/2012 Li ........................ G02B 6/3885
                                                      385/83
2016/0016218 A1 * 1/2016 Li ........................ G02B 6/4248
                                                      385/137
2017/0254965 A1 * 9/2017 Qin ....................... G02B 6/3885

FOREIGN PATENT DOCUMENTS

JP            2011-232496 A      11/2011

* cited by examiner

*Primary Examiner* — Jerry Rahll
(74) *Attorney, Agent, or Firm* — Shih IP Law Group, PLLC

(57)            ABSTRACT

An optical connector includes optical transmission members and a ferrule. The ferrule includes an alignment part for aligning the optical transmission members in a first direction; a first surface disposed to face the end surface of the aligned optical transmission members and for allowing incidence of light emitted from the optical transmission members; a second surface for allowing emission of the light incident on the first surface to the outside; a recess, disposed between the alignment part and the first surface and including a non-contact region corresponding to the end portion of the aligned optical transmission members, where the optical transmission members are disposed without contacting the non-contact region; and a lid for adjusting the position of the end surface of the optical transmission members with respect to the first surface by pressing the optical transmission members with a pressing surface contacting the optical transmission members.

12 Claims, 19 Drawing Sheets

133
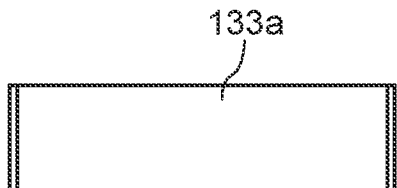
133a
FIG. 5A
133
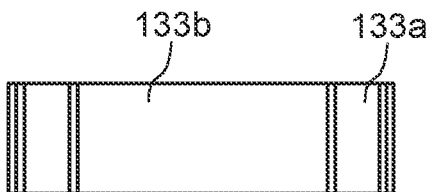
133b      133a
FIG. 5B
133
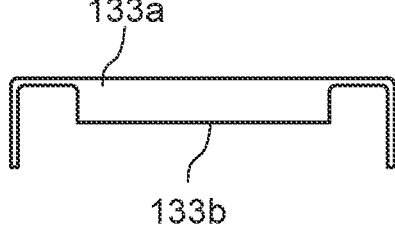
133a
133b
FIG. 5C
133
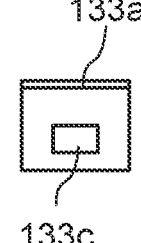
133a
133c
FIG. 5D 125
125b
125c
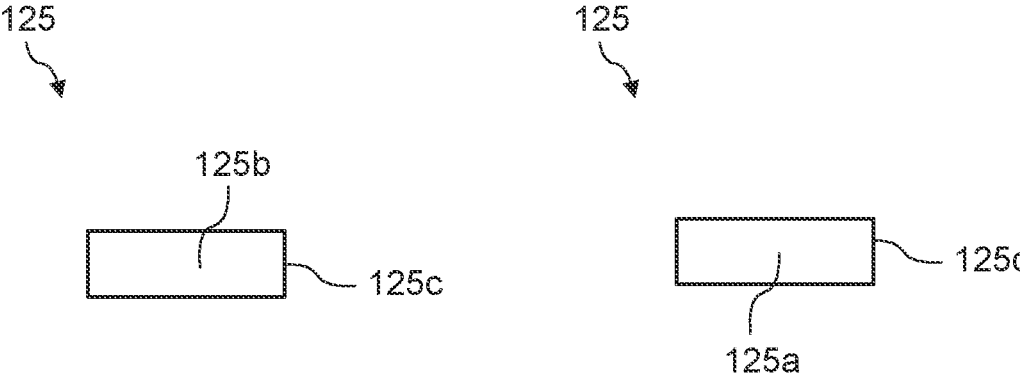
FIG. 6A
125
125c
125a
FIG. 6B
125
125b
125a
125c
FIG. 6C
125
125b
125a
125c
FIG. 6D

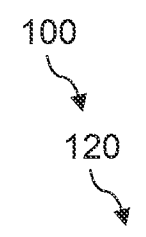
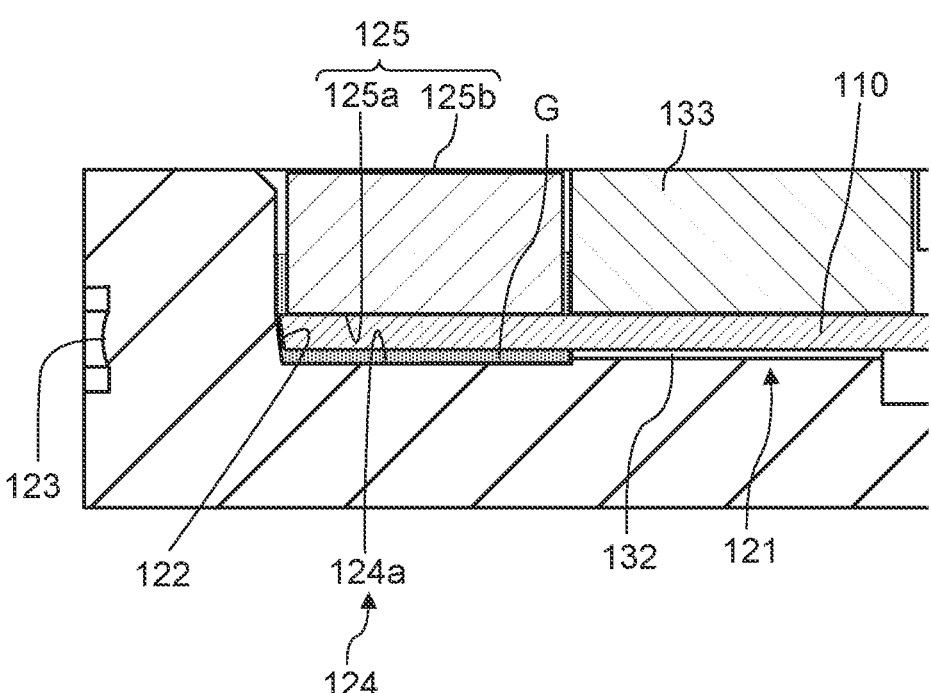
FIG. 7

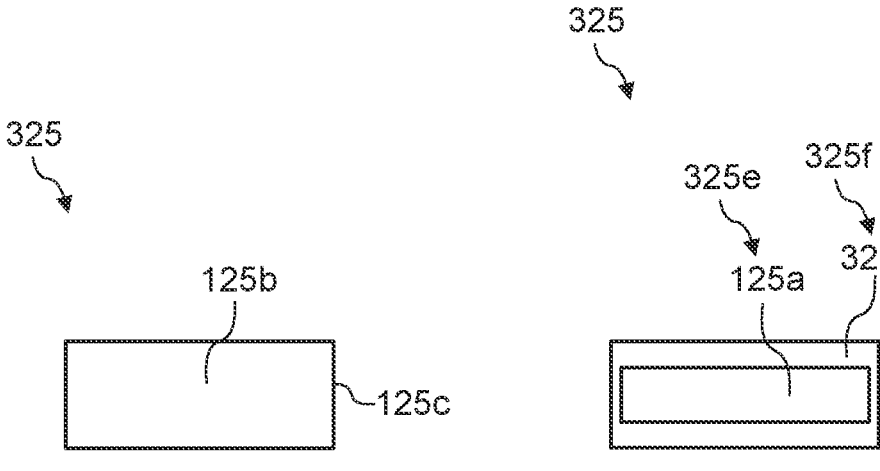
FIG. 18A                    FIG. 18B
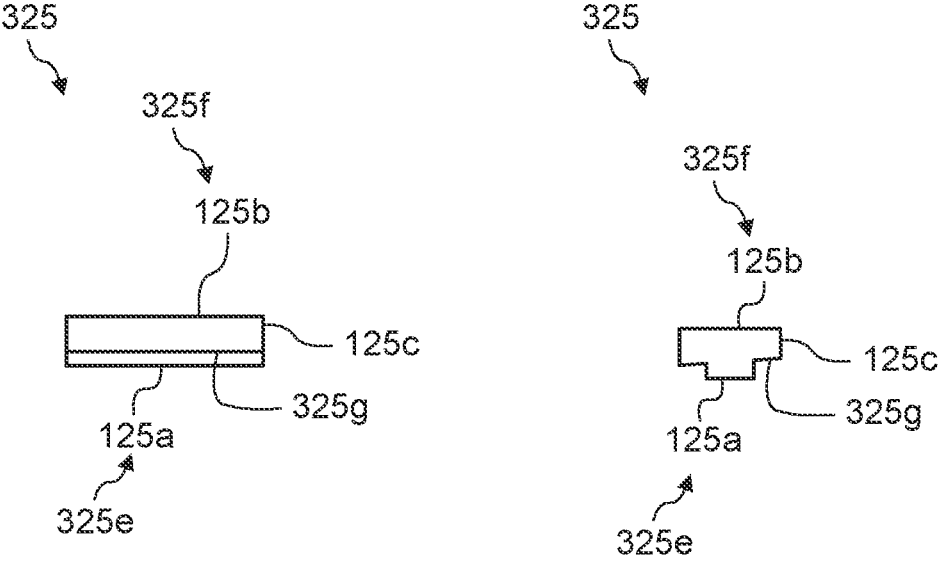
FIG. 18C                    FIG. 18D

OPTICAL CONNECTOR, OPTICAL CONNECTOR MODULE, AND METHOD FOR PRODUCING OPTICAL CONNECTOR

This application is entitled to the benefit of Japanese Patent Application No. 2022-110758, filed on Jul. 8, 2022, the disclosure of which including the specification, drawings and abstract is incorporated herein by reference in its entirety.

TECHNICAL FIELD

The present invention relates to an optical connector, an optical connector module, and a method for producing an optical connector.

BACKGROUND ART

In the field of optical communication that transmits light emitted from a light emitting element such as a surface emitting laser (for example, a vertical cavity surface emitting laser (VCSEL)), a plurality of optical transmission members have been used to expand capacity. In addition, optical connectors for optically coupling optical transmission members to each other are known (see, for example, Patent Literature (hereinafter, referred to as PTL) 1).

PTL 1 describes an optical connector module including an optical fiber and a positioning component. The positioning component includes an insertion hole, a lens, and a fitting recess. In the optical connector module described in PTL 1, the insertion of the optical fiber into the insertion hole is continued until the tip surface of the optical fiber contacts the side surface of the fitting recess. An adhesive has been applied to the tip of the optical fiber; thus the tip of the optical fiber is fixed to the side surface of the fitting recess at this time. In the optical connector module described in PTL 1, light emitted from the optical fiber enters the positioning component through the side surface of the fitting recess, and is emitted to the outside through the lens.

CITATION LIST

Patent Literature

PTL 1

Japanese Patent Application Laid-Open No. 2011-232496

SUMMARY OF INVENTION

Technical Problem

In the optical connector module described in PTL 1, the position of the end portion of the optical fiber cannot be adjusted after the optical fiber is inserted into the insertion hole.

An object of the present invention is to provide an optical connector in which the position of an end portion of an optical transmission member can be easily adjusted. Another object of the present invention is to provide an optical connector module including the optical connector. Still another object of the present invention is to provide a method for producing the optical connector.

Solution to Problem

An optical connector of the optical connector is an optical connector including a plurality of optical transmission members and a ferrule configured to hold the plurality of optical transmission members. The ferrule includes the following: an alignment part for aligning the plurality of optical transmission members in a first direction, a first surface disposed to face an end surface of the plurality of optical transmission members aligned by the alignment part, the first surface being for allowing incidence of light emitted from the plurality of optical transmission members or allowing emission of light traveling inside the optical connector to an outside, a second surface for allowing emission of the light incident on the first surface to the outside or allowing incidence of light from the outside, a recess that is disposed between the alignment part and the first surface and includes a non-contact region corresponding to an end portion of the plurality of optical transmission members aligned by the alignment part, the recess being a recess in which the plurality of optical transmission members are disposed without contacting the non-contact region, and a lid for adjusting a position of the end surface of the plurality of the optical transmission members with respect to the first surface by pressing the plurality of optical transmission members by using a pressing surface of the lid, the pressing surface being configured to contact the plurality of the optical transmission members, in which a region of the pressing surface is smaller than a region of the non-contact region in plan view.

An optical connector module of the present invention includes the optical connector of the present invention.

A method for producing an optical connector of the present invention is a method for producing the optical connector of the present invention and includes the following: aligning the plurality of optical transmission members in the first direction by the alignment part while the end portion of the plurality of optical transmission members is disposed in the recess; filling the recess with an adhesive; disposing the lid in the recess, in which the end portion of the plurality of optical transmission members is disposed; adjusting a position of the end surface of the plurality of the optical transmission members by pressing the lid toward the plurality of optical transmission members so that light emitted from the end surface of the plurality of optical transmission members is incident on a plurality of the first surfaces, or light emitted from the plurality of first surfaces is incident on the end surface of the plurality of optical transmission members; and fixing the position of the end surface of the plurality of optical transmission members by curing the adhesive, the position having been adjusted.

Advantageous Effects of Invention

The present invention can easily adjust the position of the end portion of an optical transmission member in a ferrule.

BRIEF DESCRIPTION OF DRAWINGS

FIGS. 5A to 5D illustrate the configuration of a fixing member;

FIGS. 6A to 6D illustrate the configuration of a lid;

FIG. 7 is a cross-sectional view for explaining a method of building the optical connector;

3

Figure 8:
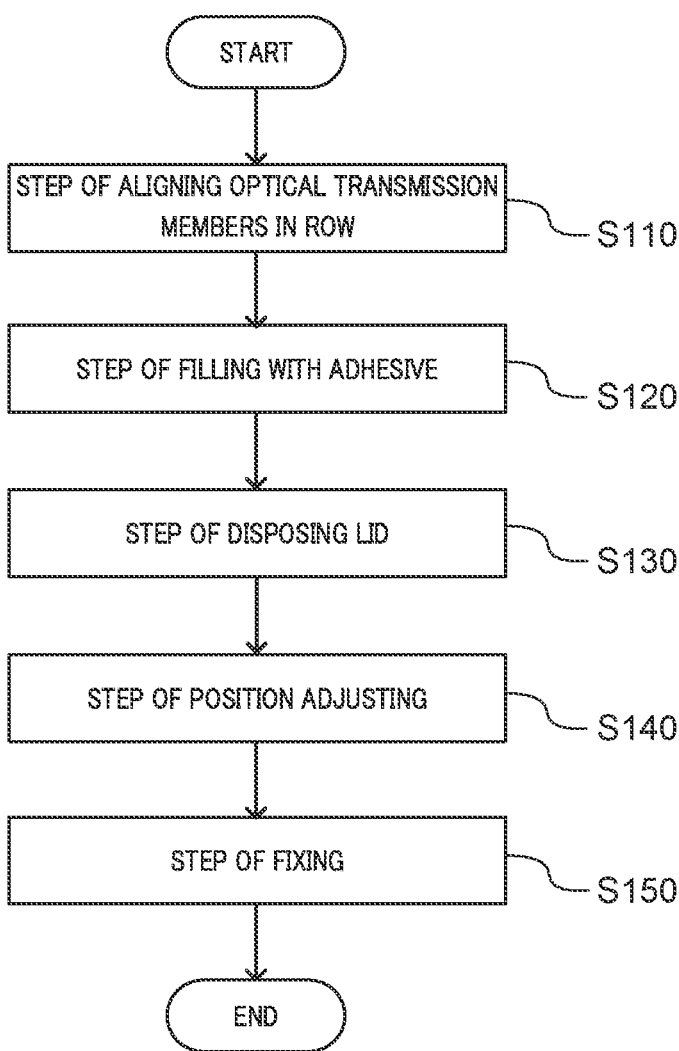
Figure 9:
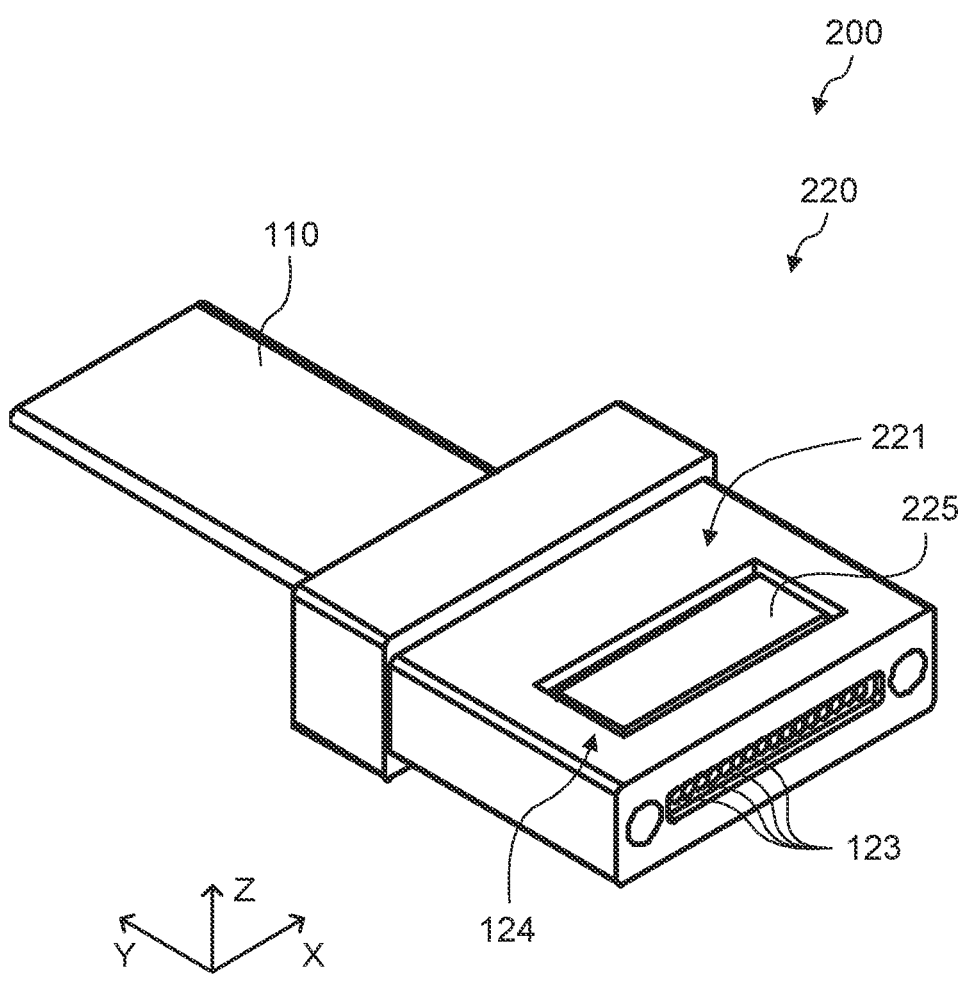
Figure 11A:
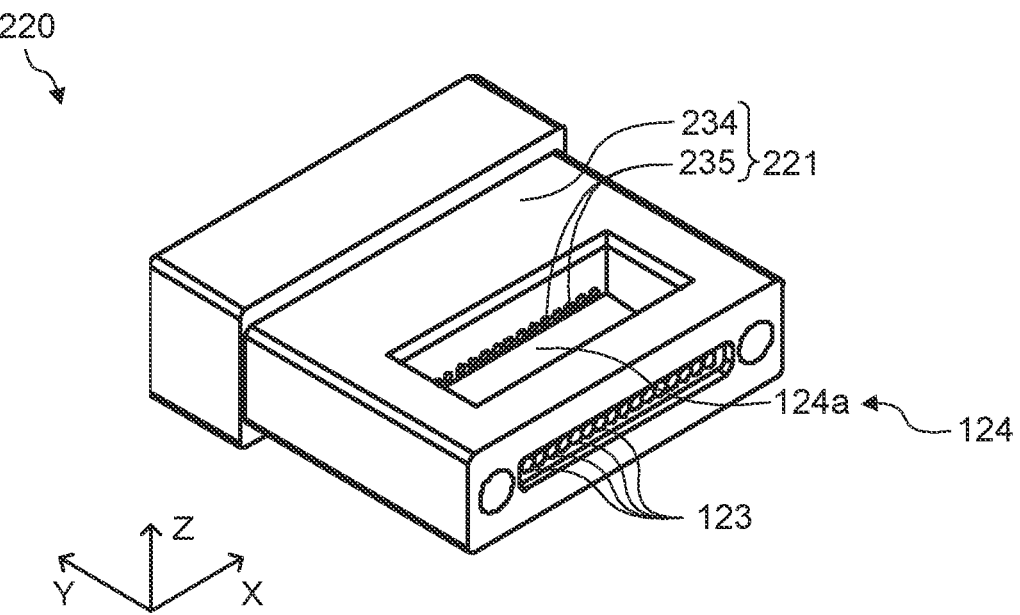
Figure 11B:
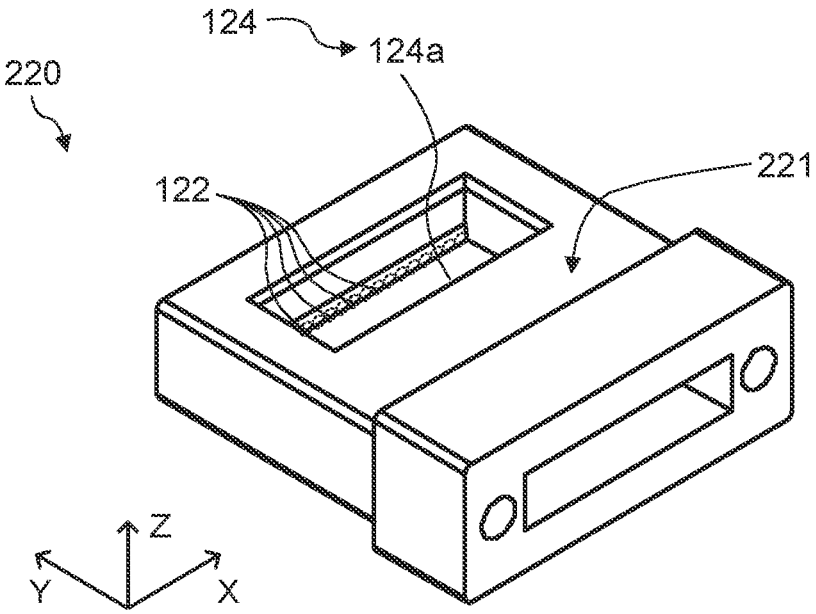
Figure 14:
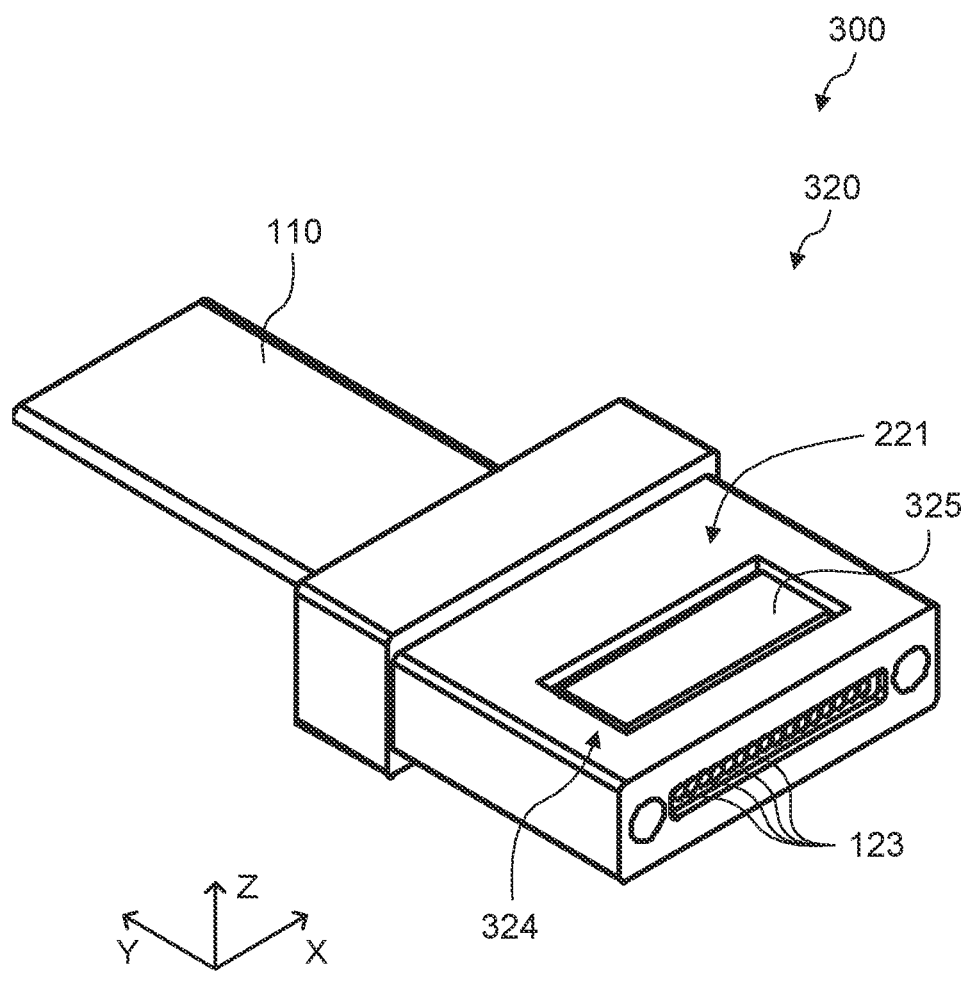
Figure 16A:
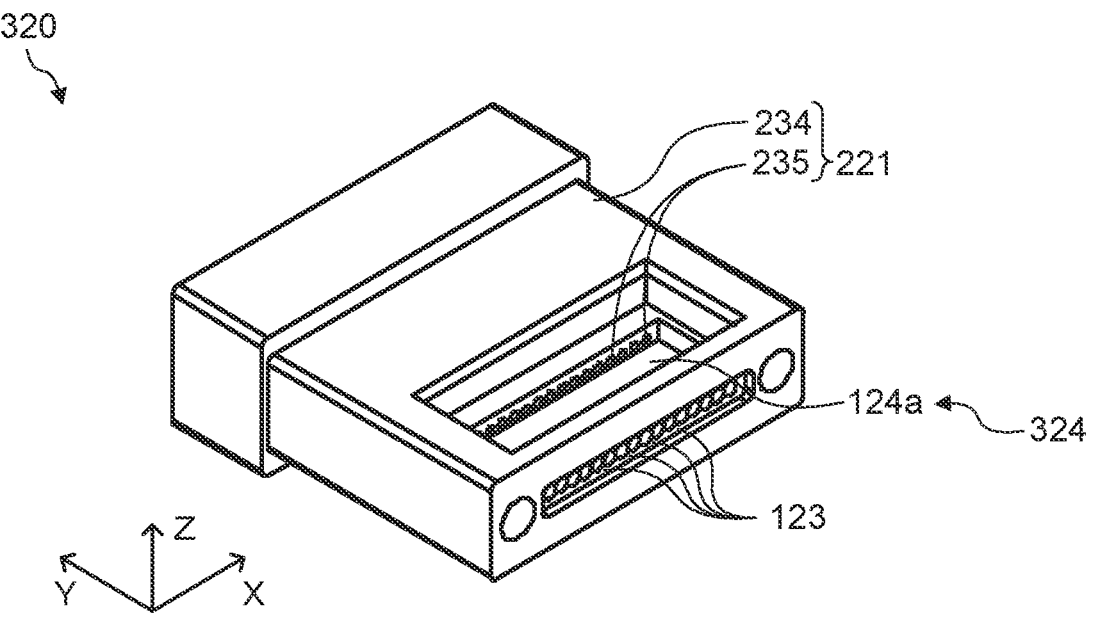
Figure 16B:
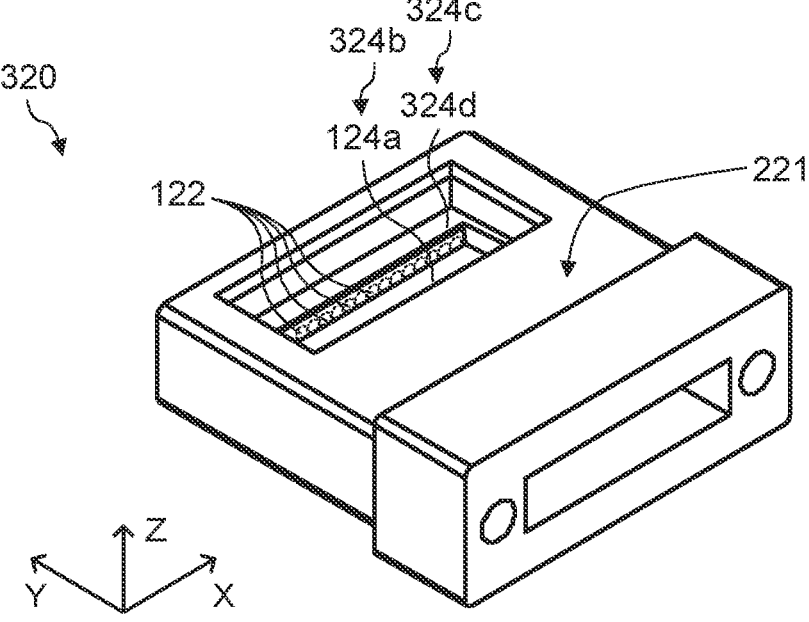

FIG. 8 is a flow chart illustrating the method for producing the optical connector according to Embodiment 1;

FIG. 9 is a perspective view of an optical connector according to Embodiment 2 of the present invention;

FIGS. 10A to 10D illustrate the configuration of the optical connector according to Embodiment 2;

FIGS. 11A and 11B are perspective views of a ferrule in Embodiment 2;

FIGS. 12A to 12D illustrate the configuration of the ferrule in Embodiment 2;

FIGS. 13A to 13D illustrate the configuration of a lid;

FIG. 14 is a perspective view of an optical connector according to Embodiment 3 of the present invention;

FIGS. 15A to 15D illustrate the configuration of the optical connector according to Embodiment 3;

FIGS. 16A and 16B are perspective views of a ferrule in Embodiment 3;

FIGS. 17A to 17D illustrate the configuration of the ferrule in Embodiment 3;

FIGS. 18A to 18D illustrate the configuration of a lid; and

Figure 19:
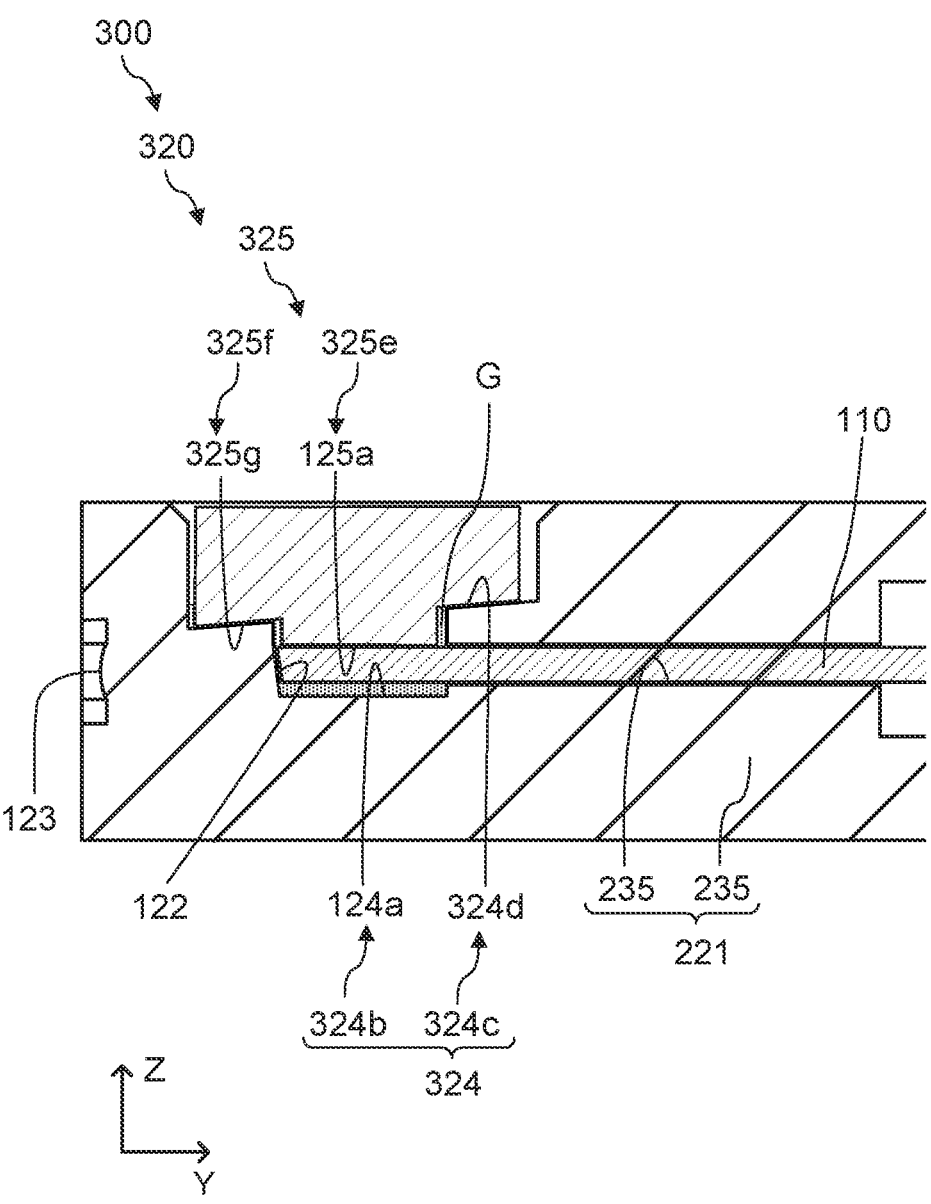

FIG. 19 is a cross-sectional view for explaining a method for building the optical connector.

DESCRIPTION OF EMBODIMENTS

Hereinafter, an optical connector and an optical connector module according to an embodiment of the present invention will be described in detail with reference to the drawings.

Embodiment 1

Configuration of Optical Connector

Figure 1:
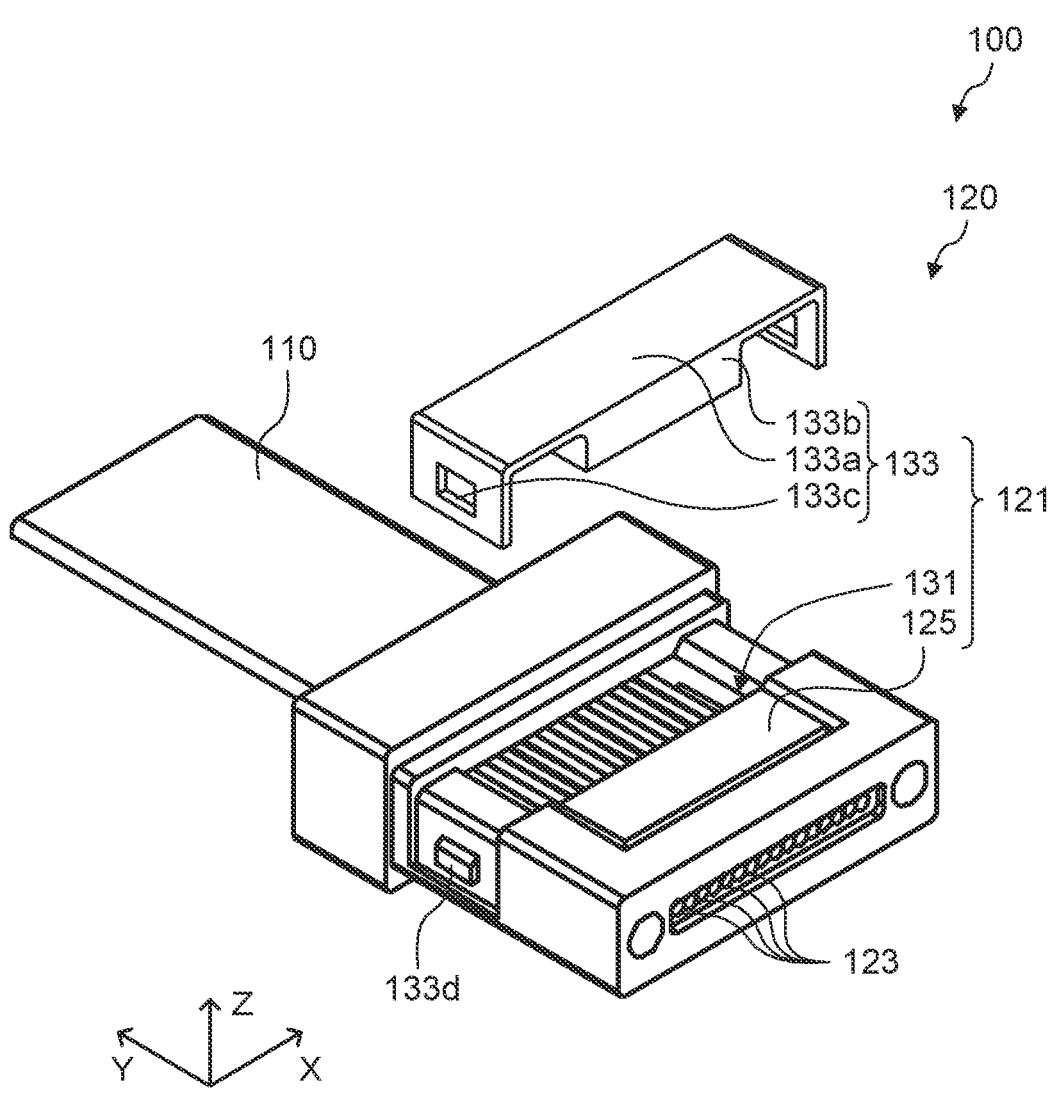
FIG. 1 is a perspective view of an optical connector according to Embodiment 1 of the present invention.
Figures 2A, 2B, 2C, 2D:
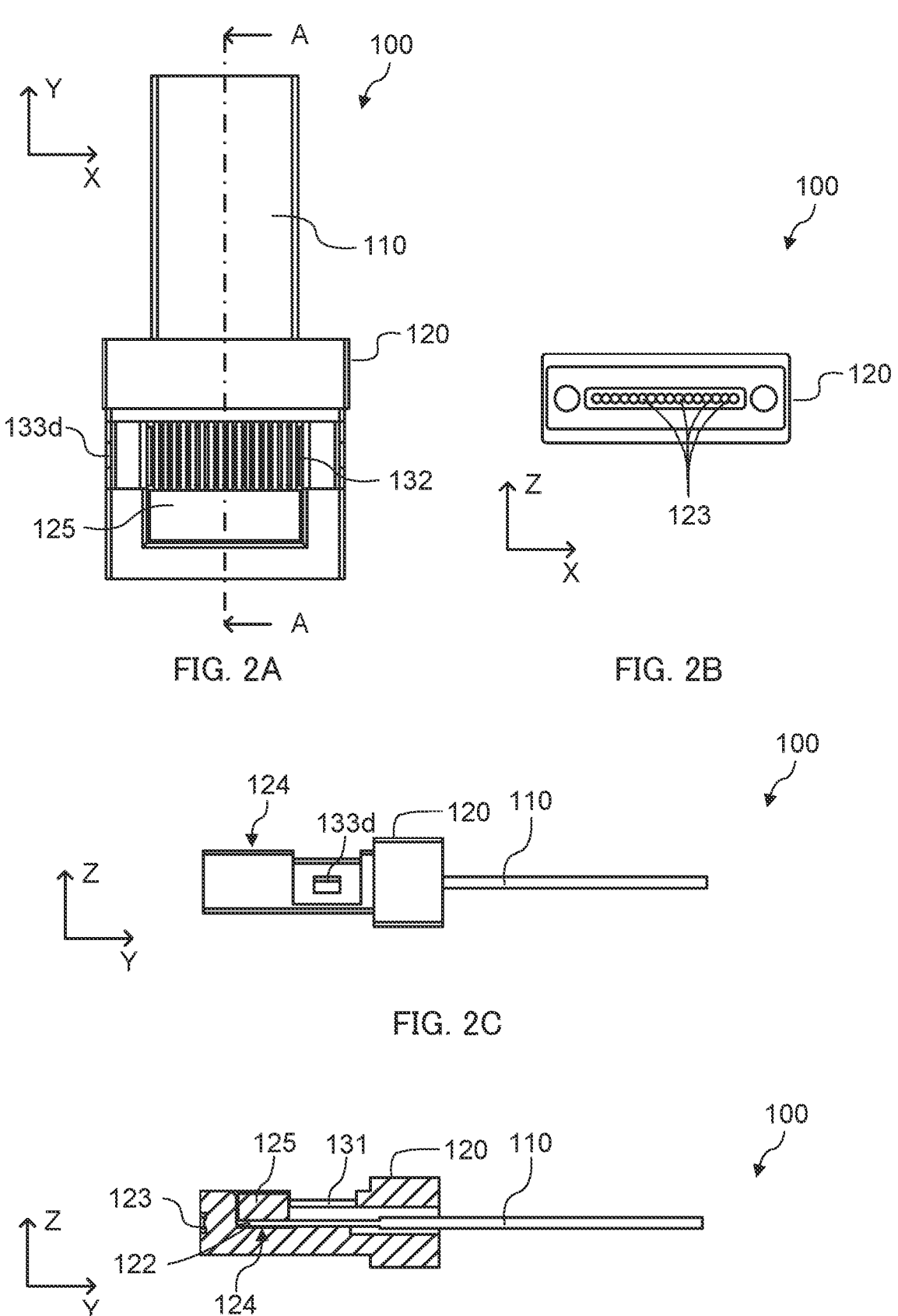
FIGS. 2A to 2D illustrate the configuration of the optical connector according to Embodiment 1.

FIG. 1 is a perspective view of optical connector 100 according to Embodiment 1 of the present invention. FIG. 2A is a plan view, FIG. 2B is a front view, FIG. 2C is a right side view, and FIG. 2D is a cross-sectional view taken along line A-A in FIG. 2A all illustrating optical connector 100 without fixing member 133.

In the following description, the direction in which optical transmission members 110 are disposed in parallel to each other (the direction in which second surfaces 123 are arranged) is referred to as the "first direction" or the "X direction," the direction in which optical transmission member 110 extends is referred to as the "second direction" or the "Y direction", and the direction perpendicular to the X direction and the Y direction is referred to as the "third direction" or the "Z direction." During the building of optical connector 100, the side from which adhesive G is injected is referred to as the upper side (upper surface), and the side opposite to the upper side is referred to as the lower side (lower surface). The upper side and the lower side do not mean directions in actual use, but are defined for explanation in the present embodiment.

As illustrated in FIGS. 1 and 2A to 2D, optical connector 100 according to Embodiment 1 includes optical transmission members 110 and ferrule 120. Optical connector 100 according to the present embodiment can be used as an optical connector module (not illustrated) together with another component such as a housing and a spring clamp structure. Optical connector 100 in the present embodiment may be used with another optical connector in a pair (two connectors in one pair) to optically connect optical transmission members 110 to each other, or may connect a photonic integrated circuit with optical transmission member 110. In the present embodiment, one optical connector 100 holding a plurality of optical transmission members 110 is connected to the other optical connector 100 holding a plurality of other optical transmission members 110 to optically couple the plurality of optical transmission members 110 to the plurality of other optical transmission members 110.

The type of optical transmission member 110 is not limited. Examples of optical transmission members 110 include optical fibers and optical waveguides. In the present embodiment, optical transmission member 110 is an optical fiber. The optical fiber may be a single-mode optical fiber or a multi-mode optical fiber. The end surface of optical transmission member 110 is preferably inclined with respect to a plane (XZ plane) orthogonal to the extending direction of optical transmission member 110. In the present embodiment, the inclination angle with respect to the plane is, for example, 8°. The number of optical transmission members 110 is not limited as long as the number is more than one. In the present embodiment, the number of optical transmission members 110 is 16. The end portion of optical transmission member 110 is fixed to ferrule 120.

Figure 3A:
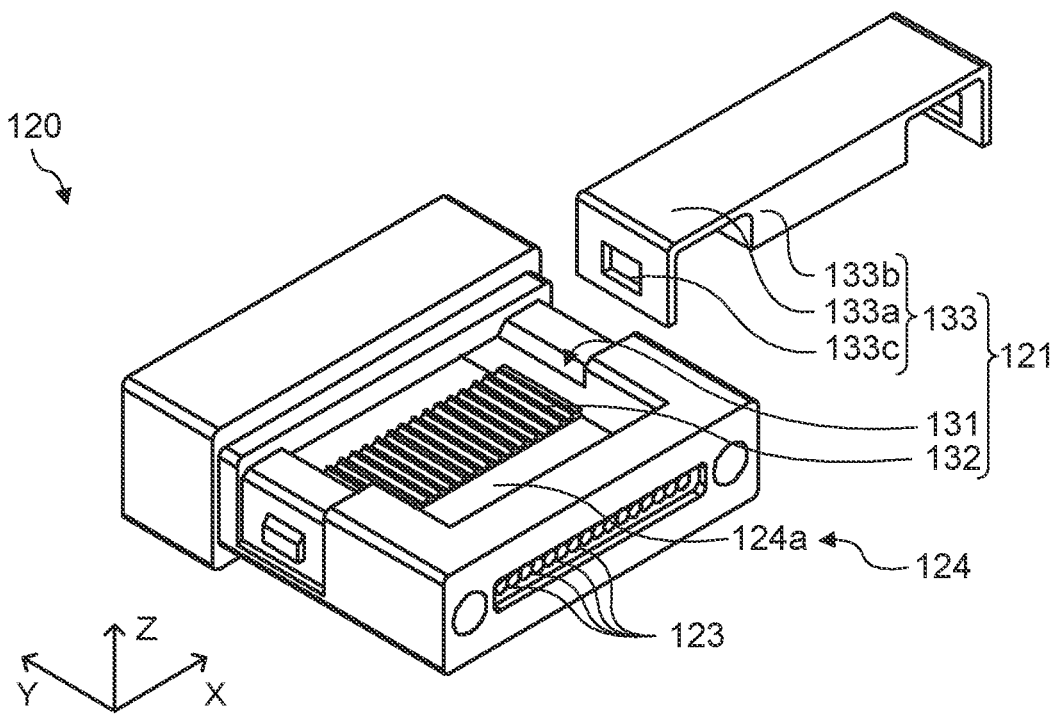
FIGS. 3A and 3B are perspective views of a ferrule in Embodiment 1.
Figure 3B:
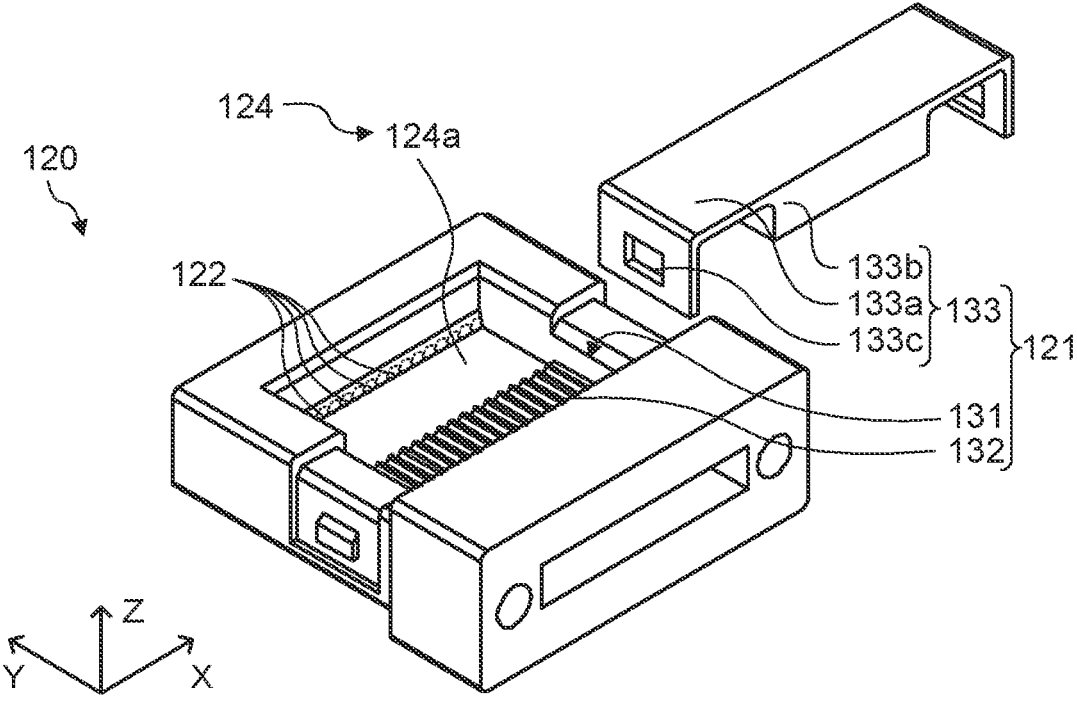
Figures 4A, 4B, 4C, 4D:
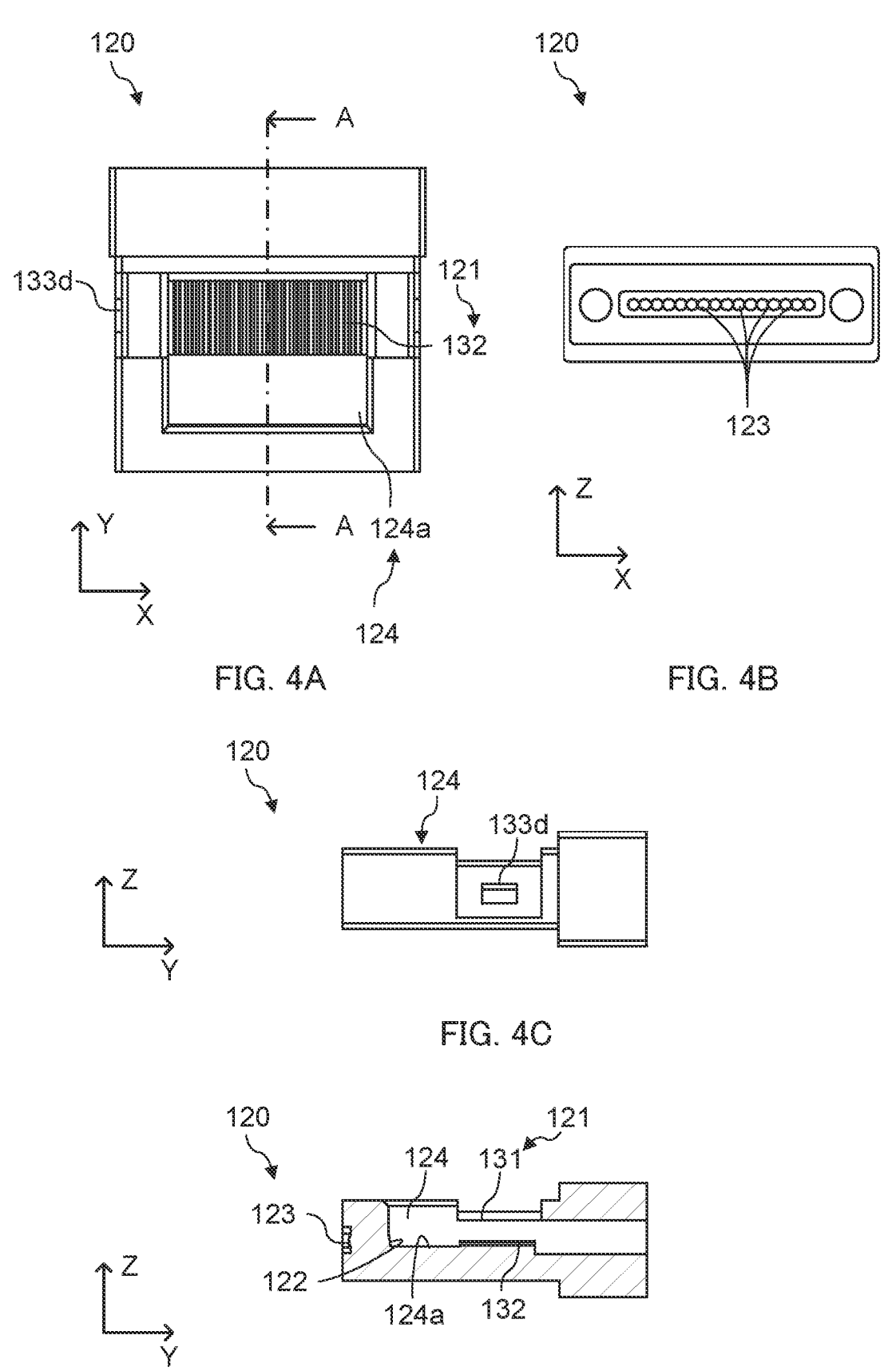
FIGS. 4A to 4D illustrate the configuration of the ferrule in Embodiment 1.

Configuration of Ferrule FIGS. 3A, 3B, and 4A to 4D illustrate the configuration of ferrule 120, from which lid 125 is removed, according to Embodiment 1 of the present invention. FIG. 3A is a perspective view of ferrule 120 viewed from the front side, and FIG. 3B is a perspective view of ferrule 120 viewed from the rear side. FIG. 4A is a plan view, FIG. 4B is a front view, FIG. 4C is a right side view, and FIG. 4D is a cross-sectional view taken along line A-A in FIG. 4A all illustrating ferrule 120 without fixing member 133.

As illustrated in FIGS. 3A, 3B, and 4A to 4D, ferrule 120 is a substantially rectangular parallelepiped member. Ferrule 120 includes alignment part 121, a plurality of first surfaces 122, a plurality of second surfaces 123, recess for fixing (herein also referred to as "fixing recess") (recess) 124, and lid 125 (see FIG. 6).

Ferrule 120 is fixed to end portions of the plurality of optical transmission members 110 located on one side thereof. Ferrule 120 is formed of a material that allows light having a wavelength used for optical communication to pass therethrough. Examples of the material of ferrule 120 include transparent resins including polyetherimide (PEI), such as ULTEM (registered trademark), and cyclic olefin resins. Ferrule 120 may be produced by injection molding, for example.

Alignment part 121 is configured to align the plurality of optical transmission members 110 in the first direction (X direction) and hold the optical transmission members. Alignment part 121 may have any configuration as long as the end portions of the plurality of optical transmission members 110 can be aligned in a first direction (X direction) and held in proper positions. Alignment part 121 may be configured to press and hold optical transmission members 110 or may be configured to allow insertion of the end portions of optical transmission members 110 and hold the optical transmission members (see Embodiments 2 and 3). In the present embodiment, alignment part 121 is configured to press and hold optical transmission members 110. In the present embodiment, alignment part 121 includes recess for alignment (herein also referred to as "alignment recess") 131, a plurality of first grooves 132, and fixing member 133.

Alignment recess 131 is open on the upper surface of ferrule 120. In the present embodiment, alignment recess 131 is formed integrally with fixing recess (recess) 124. The plurality of first grooves 132 are disposed on the bottom surface of alignment recess 131.

First grooves 132 are configured to align the plurality of optical transmission members 110 in the first direction (X direction). The plurality of first grooves 132 each extend in the second direction (Y direction). The number of first grooves 132 is equal to or greater than the number of optical transmission members 110 to be installed. In the present embodiment, the number of first grooves 132 is 16. First groove 132 may have any cross-sectional shape. First groove 132 may be a V-shaped groove or a U-shaped groove. In the present embodiment, first groove 132 is a V-shaped groove. First groove 132 preferably has a depth such that in a state where optical transmission member 110 is disposed in first groove 132, the upper end portion of optical transmission member 110 is located above the upper end portion of first groove 132 (protrusion). First groove 132 may be disposed in parallel with the back surface of ferrule 120 or may be inclined with respect to the back surface of ferrule 120. In the present embodiment, first groove 132 is disposed in parallel with the back surface of ferrule 120.

FIG. 5A is a plan view, FIG. 5B is a bottom view, FIG. 5C is a front view, and FIG. 5D is a right side view all illustrating fixing member 133.

Fixing member 133 presses the plurality of optical transmission members 110 toward first grooves 132 and fixes the optical transmission members. Fixing member 133 may have any configuration as long as the fixing member can exhibit the above function. In the present embodiment, fixing member 133 includes fixing member main body 133a, pressing part 133b, and engaging holes 133c as illustrated in FIGS. 5A to 5D. Fixing member main body 133a is formed in a plate shape as a whole, and both end portions thereof are bent downward. Pressing part 133b is disposed on the lower surface of fixing member main body 133a, and engaging holes 133c are respectively disposed at both end portions of the fixing member main body 133a. Each engaging hole 133 engages with corresponding engaging projection 133d disposed on the side surface of ferrule 120. With the plurality of optical transmission members 110 respectively disposed in the plurality of first grooves 132, the plurality of optical transmission members 110 are fixed to first grooves 132 by disposing fixing member 133 in such a way that engaging projections 133d engage with engaging holes 133c.

Fixing recess (recess) 124 is disposed between alignment part 121 and first surface 122 and includes a non-contact region corresponding to the end portions of the plurality of optical transmission members 110 aligned by alignment part 121; end portions of the plurality of optical transmission members 110 are disposed in the fixing recess (recess); and the fixing recess (recess) is filled with adhesive G (see FIG. 7). Fixing recess 124 is formed to have a depth such that when optical transmission members 110 are aligned by alignment part 121, optical transmission members 110 do not contact bottom surface 124a (non-contact region)—parallel to the XY plane—of fixing recess 124. In other words, in a state where optical transmission members 110 are aligned by alignment part 121, bottom surface 124a of fixing recess 124 is disposed closer to the back surface of ferrule 120 than the lowermost parts of optical transmission members 110 are, in the present embodiment. This configuration allows lid 125 to push optical transmission members 110 toward the back surface of ferrule 120. Herein, the non-contact region means a portion of the space corresponding to the plurality of optical transmission members 110 when the plurality of optical transmission members 110 are disposed in fixing recess 124. Bottom surface 124a is a flat surface disposed closest to the back surface of ferrule 120.

The plurality of first surfaces 122 are disposed to face the end surfaces of the plurality of optical transmission members 110 aligned by alignment part 121. First surfaces 122 allow thereon incidence of light emitted from the plurality of optical transmission members 110 and direct the light toward second surfaces 123. Alternatively, first surfaces 122 emit light incident on second surfaces 123 and traveling inside ferrule 120—toward the end surfaces of the plurality of optical transmission members 110. First surface 122 may have any shape as long as the first surface can exhibit the above functions. First surface 122 may be a convex surface or a flat surface. In the present embodiment, first surface 122 is a flat surface. First surfaces 122 are disposed at a portion of the inner surface of fixing recess 124. First surface 122 may be inclined so as to approach second surface 123 as the first surface approaches the top surface of ferrule 120, or may be perpendicular to the back surface of ferrule 120. In the present embodiment, first surface 122 is inclined so as to approach second surface 123 as the first surface approaches the top surface of ferrule 120.

The surface on which first surfaces 122 are disposed may be inclined so as to approach second surface 123 as the surface approaches the top surface of ferrule 120, or may be perpendicular to the back surface of ferrule 120. In the present embodiment, the surface on which first surfaces 122 are disposed is inclined so as to approach second surface 123 as the surface approaches the top surface of ferrule 120. The inclination angle of first surface 122 is preferably the same as the inclination angle of the end surface of optical transmission member 110.

That is, in the present embodiment, the plurality of first surfaces 122 and the surface, on which the plurality of first surfaces 122 are disposed, are configured to be on the same plane. The inclination angle of first surface 122 and the surface on which first surfaces 122 are disposed is, for example, in the range of 3° to 8°, preferably 5° to 8°, when the Z direction is 0°. In the present embodiment, the inclination angle of first surface 122 and the surface, on which first surfaces 122 are disposed, is 8° when the Z direction is 0°.

In addition, when the end portions of the plurality of optical transmission members 110 are disposed in the fixing recess 124, the end surface of each optical transmission member 110 is preferably separated from corresponding first surface 122. When the end surface of optical transmission member 110 contacts first surface 122, the end surface of optical transmission member 110 or first surface 122 may be damaged while adjusting the position of the end surface of optical transmission member 110.

The plurality of second surfaces 123 emit light incident on first surfaces 122 toward another optical connector. Alternatively, second surfaces 123 allow thereon incidence of light from another optical connector and direct the light toward first surfaces 122. Second surface 123 may have any shape as long as the second surface can exhibit the above functions. Second surface 123 may be a convex surface or a flat surface. In the present embodiment, second surface 123 is a convex surface. Second surface 123 is disposed at the front surface of ferrule 120. Second surface 123 may have any shape in plan view. The shape of second surface 123 in plan view may be circular or rectangular. In the present embodiment, the shape of second surface 123 in plan view is circular. In addition, the number of second surfaces 123 is the same as the number of optical transmission members 110. That is, the number of second surfaces 123 is 16 in the present embodiment.

FIG. 6A is a plan view, FIG. 6B is a bottom view, FIG. 6C is a front view, and FIG. 6D is a right side view all illustrating lid 125.

Lid 125 presses the plurality of optical transmission members 110 and adjusts the height of the end surfaces of the plurality of optical transmission members 110. At least a portion of lid 125 is configured to be housed in fixing recess 124. Lid 125 may have any shape as long as the lid can exhibit the above functions. As illustrated in FIGS. 6A to 6D, the shape of lid 125 is a rectangular parallelepiped in the present embodiment. Lid 125 of the present embodiment is configured to be entirely housed in fixing recess 124. Lid 125 includes pressing surface 125a, pressed surface 125b, and side surfaces 125c. Pressing surface 125a is configured to press the plurality of optical transmission members 110, pressed surface 125b is disposed on the side opposite to pressing surface 125a and configured to be pressed by an external device, and side surfaces 125c connect pressing surface 125a with pressed surface 125b. Lid 125 is a rectangular parallelepiped; thus, pressing surface 125a and pressed surface 125b are parallel to each other.

Lid 125 is configured to be housed in fixing recess 124. The region of pressing surface 125a is smaller than the region of the non-contact region in plan view. The distance between the outer edge of pressing surface 125a of lid 125 and a portion (located at the same height as pressing surface 125a) of the inner surface of fixing recess 124 is preferably 0.1 mm or more. When the distance between the outer edge of pressing surface 125a and the inner surface of fixing recess 124 is 0.1 mm or more, lid 125 can also be moved in the horizontal direction (X and Y directions); therefore, the position of optical transmission member 110 can be adjusted with higher accuracy. Further, lid 125 is smaller than fixing recess 124 in plan view. The width of pressing surface 125a in the extending direction (Y direction) of optical transmission member 110 is preferably within the range of 0.4 mm to 2.5 mm.

In fixing recess 124, adhesive G (see FIG. 7) fixes optical transmission members 110 while the end surfaces of optical transmission members 110 are facing first surfaces 122. Adhesive G may be a thermosetting resin or an ultraviolet curable resin. In the present embodiment, adhesive G is an ultraviolet curable resin that allows light to pass therethrough. Herein, the term "adhesive G" is directed to both a state before curing and a state after curing.

Method for Producing Optical Connector

In the following, a method for producing optical connector 100 will be described. FIG. 7 is a cross-sectional view for explaining a method for producing optical connector 100. FIG. 8 is a flow chart illustrating the method for producing optical connector 100.

Optical connector 100 may be produced, for example, by the following method. As illustrated in FIGS. 7 and 8, the method for producing optical connector 100 includes the following steps: aligning optical transmission members 110 in a row (S110), filling with adhesive G (S120), disposing a lid (S130), position adjusting (S140), and fixing (S150).

In the step of aligning optical transmission members 110 in a row (S110), the plurality of optical transmission members 110 are disposed in the plurality of first grooves 132 in such a way that the end portions (end surfaces) of optical transmission members 110 face first surfaces 122 in fixing recess 124, respectively. Fixing member 133 then presses optical transmission members 110 against first grooves 132 to fix the optical transmission members. At this time, the end portions of the plurality of optical transmission members 110 are disposed at positions separated from the bottom surface in fixing recess 124. Optical transmission member 110 is configured to be slightly bendable; thus, the end surface of optical transmission member 110 may be displaced from first surface 122.

In the step of filling with adhesive G (S120), fixing recesses 124, in which the end portions of the plurality of optical transmission members 110 are disposed, is filled with adhesive G. At this time, filling is preferably performed so that adhesive G covers optical transmission members 110.

In the step of disposing lid 125 (S130), lid 125 is disposed in fixing recess 124 filled with adhesive G.

In the step of position adjusting (S140), the end surfaces of optical transmission members 110 are allowed to face first surfaces 122. Specifically, the positions of the plurality of first surfaces 122 and the end surfaces of the plurality of optical transmission members 110 are adjusted by pressing lid 125 toward the end portions of the plurality of optical transmission members 110 while monitoring whether or not light emitted from the end surfaces of the plurality of optical transmission members 110 is properly incident on the plurality of first surfaces 122, respectively, or whether light emitted from the plurality of first surfaces 122 is properly incident on the end surfaces of the plurality of optical transmission members 110, respectively. For example, the end surfaces of optical transmission members 110 are adjusted to properly face first surfaces 122 by pressing pressed surface 125b of lid 125 with an external device, thereby pressing optical transmission members 110 with pressing surface 125a while observing the monitor results.

In the step of fixing (S150), the positions of the end surfaces of the plurality of optical transmission members 110, whose positions have been adjusted, are fixed by curing adhesive G. In the present embodiment, adhesive G is cured by irradiating the adhesive with ultraviolet light while the end surfaces of optical transmission members 110 are facing first surfaces 122.

Through the above steps, optical connector 100 can be built by fixing optical transmission members 110 to ferrule 120.

In the present embodiment, the steps are performed in the following order: aligning optical transmission members 110 in a row (S110), filling with adhesive G (S120), disposing lid 125 (S130), and position adjusting (S140); however, the order is not limited thereto as long as optical connector 100 can be built at the end. For example, the step of filling with adhesive G (S120) may be performed before the step of aligning optical transmission members 110 in a row (S110); or the step of disposing lid 125 (S130) may be performed before the step of filling with adhesive G (S120).

Effects

The end portions of the plurality of optical transmission members 110 do not contact the bottom surface of the fixing recess in optical connector 100 of the present embodiment, and the optical connector includes lid 125; thus the height of the end surfaces of the plurality of optical transmission members 110 can be easily adjusted.

Embodiment 2

Configuration of Optical Connector

In the following, optical connector 200 according to Embodiment 2 will be described. Optical connector 200 according to the present embodiment differs from optical connector 100 of Embodiment 1 only in the configuration of alignment part 221. Configurations the same as those in Embodiment 1 are denoted by the same reference numerals, and descriptions thereof are omitted. Therefore, in the following description, ferrule 220 will be mainly described.

Figures 10A, 10B:
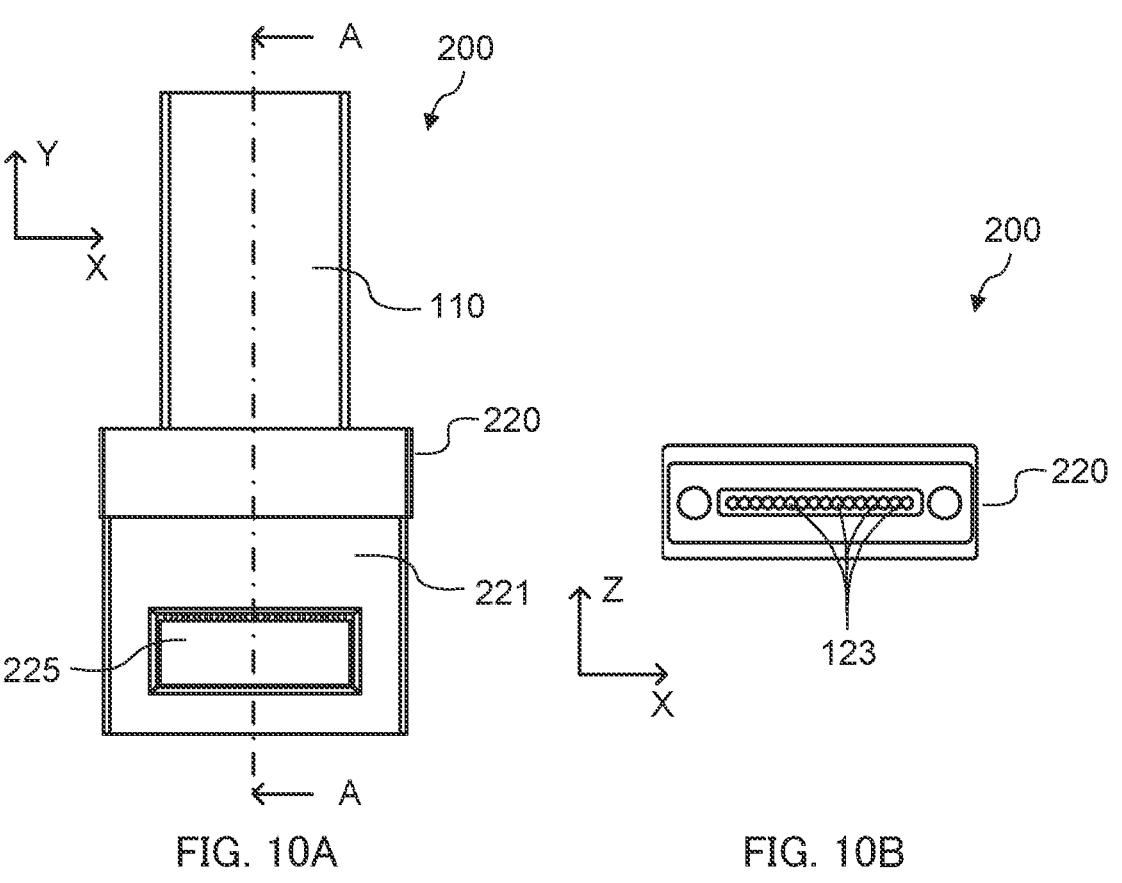
Figure 10C:
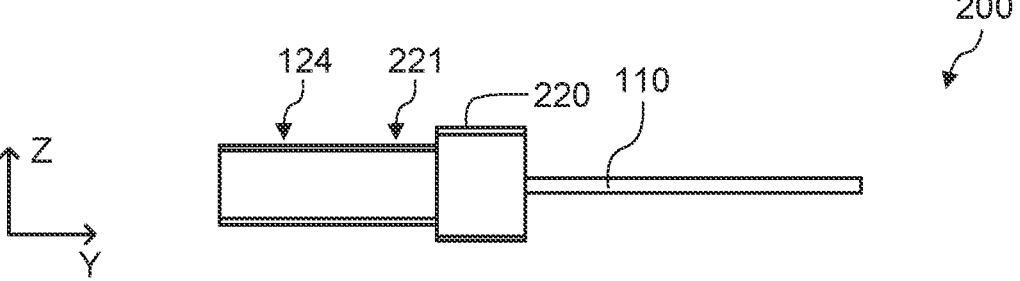
Figure 10D:
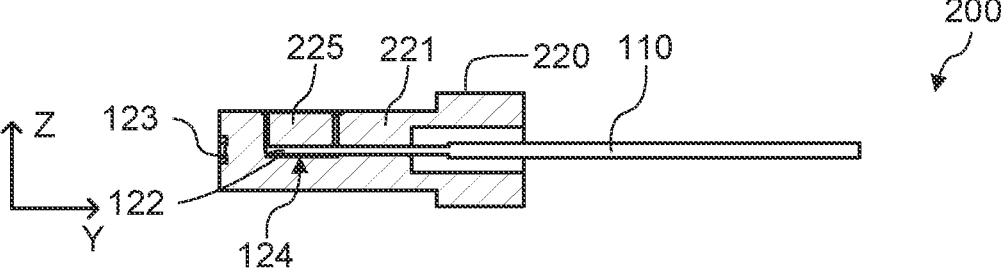

FIG. 9 is a perspective view of optical connector 200 according to Embodiment 2 of the present invention. FIG. 10A is a plan view, FIG. 10B is a front view, FIG. 10C is a right side view, and FIG. 10D is a cross-sectional view taken along line A-A in FIG. 10A all illustrating optical connector 200.

As illustrated in FIGS. 9 and 10A to 10D, optical connector 200 according to Embodiment 2 includes optical transmission members 110 and ferrule 220. Optical connector 200 according to the present embodiment can be used as an optical connector module (not illustrated) together with another component such as a housing and a spring clamp structure.

Configuration of Ferrule

Figures 12A, 12B:
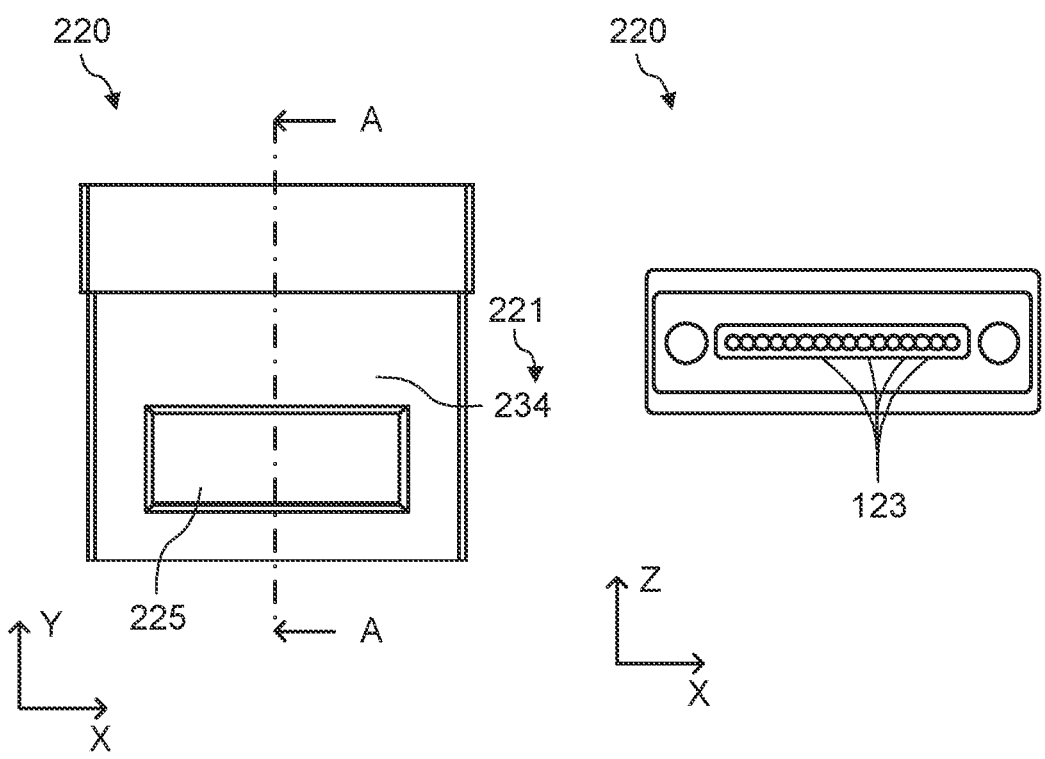
Figure 12C:
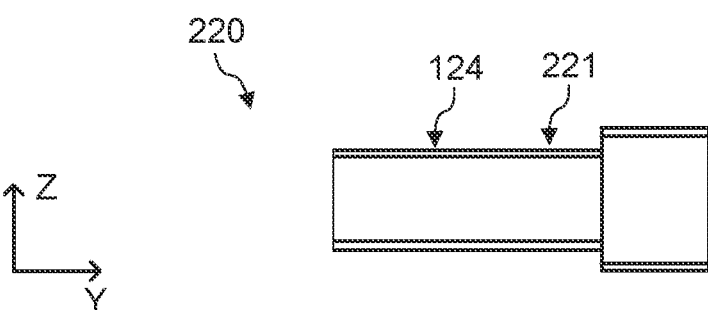
Figure 12D:
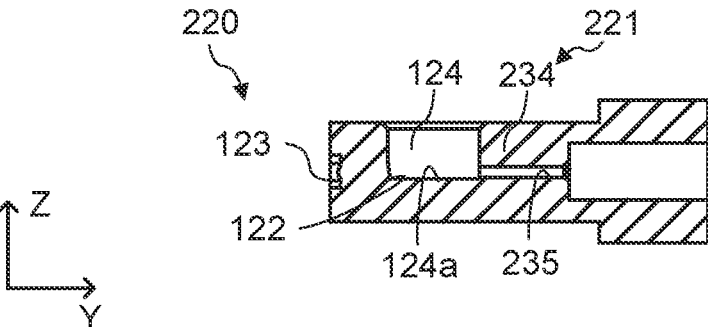

FIGS. 11A, 11B, and 12A to 12D illustrate the configuration of ferrule 220, from which lid 225 is removed, according to Embodiment 2 of the present invention. FIG. 11A is a perspective view of ferrule 220 viewed from the front side, and FIG. 11B is a perspective view of ferrule 220 viewed from the rear side. FIG. 12A is a plan view, FIG. 12B is a front view, FIG. 12C is a right side view, and FIG. 12D is a cross-sectional view taken along line A-A in FIG. 12A all illustrating ferrule 220.

As illustrated in FIGS. 11A, 11B, and 12A to 12D, ferrule 220 includes alignment part 221, a plurality of first surfaces 122, a plurality of second surfaces 123, fixing recess (recess) 124, and lid 225 (see FIG. 13). First surface 122, second surface 123, and fixing recess 124 are the same as those in Embodiment 1; thus the description thereof will be omitted.

Alignment part 221 aligns the plurality of optical transmission members 110 in a row and holds the optical transmission members. In the present embodiment, alignment part 221 is configured to allow insertion of the end portions of optical transmission members 110 and hold the end portions. In the present embodiment, alignment part 221 includes wall 234 and a plurality of through holes 235.

Wall 234 is disposed on the rear side of fixing recess 124 in ferrule 220, and is a portion where through holes 235 (into which the plurality of optical transmission members 110 are to be inserted) are formed.

The plurality of through holes 235 are for disposing the plurality of optical transmission members 110 at predetermined intervals. Through hole 235 may have any size as long as optical transmission member 110 can be inserted therein. One end of through hole 235 is open to fixing recess 124 and the other end thereof is open to the rear side of ferrule 220. In the present embodiment, through hole 235 is formed in a cylindrical shape. In the same manner as in the previous embodiment, the end portions of the plurality of optical transmission members 110 aligned by alignment part 221 are disposed without contacting the bottom surface in the present embodiment. In other words, in a state where optical transmission members 110 are aligned by alignment part 221, the bottom surface of fixing recess 124 is disposed closer to the back surface of ferrule 220 than the bottom portions of through holes 235 are, in the present embodiment. This configuration allows optical transmission members 110 to be pushed toward the back surface of ferrule 220. In the present embodiment, the plurality of through holes

235 are disposed corresponding to the plurality of optical transmission members 110; however, one through hole having a shape of an elongated hole is also possible.

Figures 13A, 13B:
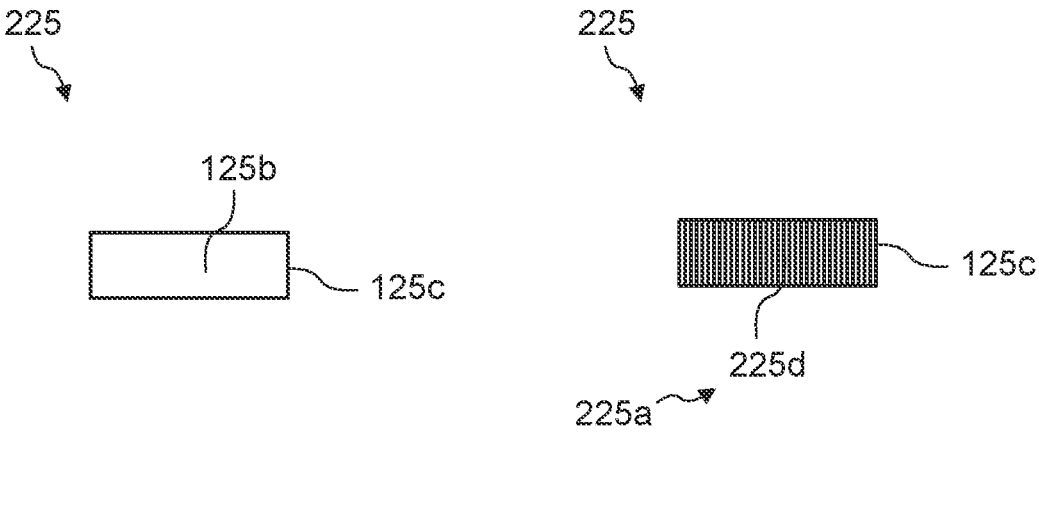
Figures 13C, 13D:
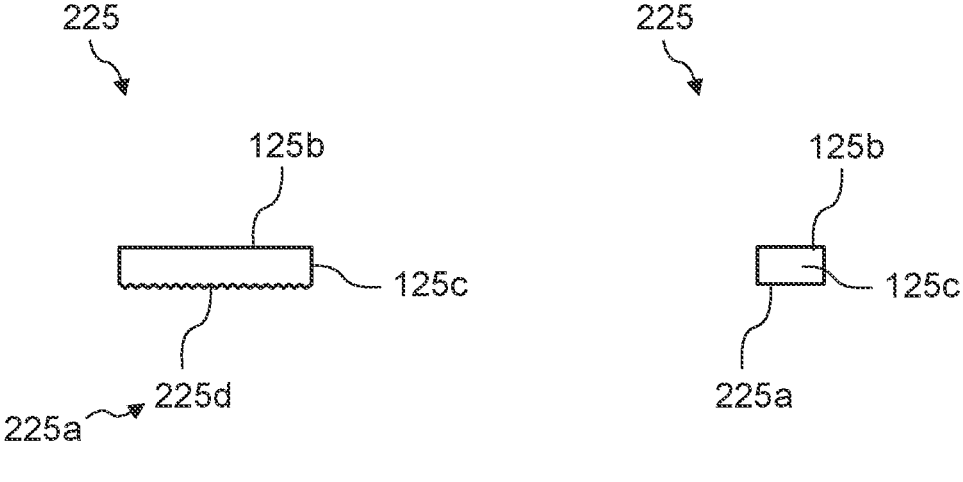

FIG. 13A is a plan view, FIG. 13B is a bottom view, FIG. 13C is a front view, and FIG. 13D is a right side view all illustrating lid 225.

As illustrated in FIGS. 13A to 13D, lid 225 presses the plurality of optical transmission members 110 and adjusts the height of the end surfaces of the plurality of optical transmission members 110. In the present embodiment, lid 225 has a substantially rectangular parallelepiped shape. Lid 225 includes pressing surface 225a and pressed surface 125b. Pressing surface 225a is configured to contact the plurality of optical transmission members 110, and pressed surface 125b is disposed on the side opposite to pressing surface 225a and configured to be pressed by an external device. A plurality of second grooves 225d are disposed in pressing surface 225a.

Second grooves 225d each extend in the second direction (Y direction). The number of second grooves 225d is equal to or greater than the number of optical transmission members 110 to be installed. In the present embodiment, the number of second grooves 225d is 16. Second groove 225d may have any cross-sectional shape. Second groove 225d may be a V-shaped groove or a U-shaped groove. In the present embodiment, second groove 225d is a V-shaped groove. Second groove 225d preferably has a depth such that in a state where the positions (height) of the end surfaces of optical transmission members 110 are adjusted with lid 225, the second grooves do not contact bottom surface 124a. Second groove 225d may be disposed parallel to pressing surface 225a, or may be inclined with respect to pressing surface 225a. In the present embodiment, second groove 225d is disposed parallel to pressing surface 225a. Second groove 225d is disposed so as to correspond to bottom surface 124a. The number of second grooves 225d is 16 in the present embodiment.

The method for producing optical connector 200 according to the present embodiment is the same as that of Embodiment 1 except that optical transmission member 110 is inserted from opening of through hole 235 located on the rear side.

Effects

Optical connector 200 according to the present embodiment has the same effects as optical connector 100 of Embodiment 1. In addition, optical connector 200 according to the present embodiment does not include fixing member 133; thus, the number of parts can be reduced, thereby reducing the cost.

Embodiment 3

Configuration of Optical Connector

In the following, optical connector 300 according to Embodiment 3 will be described. Optical connector 300 according to the present embodiment differs from optical connector 200 according to Embodiment 2 only in the configurations of fixing recess (recess) 324 and lid 325. Configurations the same as those in Embodiment 2 are denoted by the same reference numerals, and descriptions thereof are omitted. Therefore, in the following description, ferrule 320 will be mainly described.

FIG. 14 is a perspective view of optical connector 300 according to Embodiment 3 of the present invention. FIG.

Figures 15A, 15B:
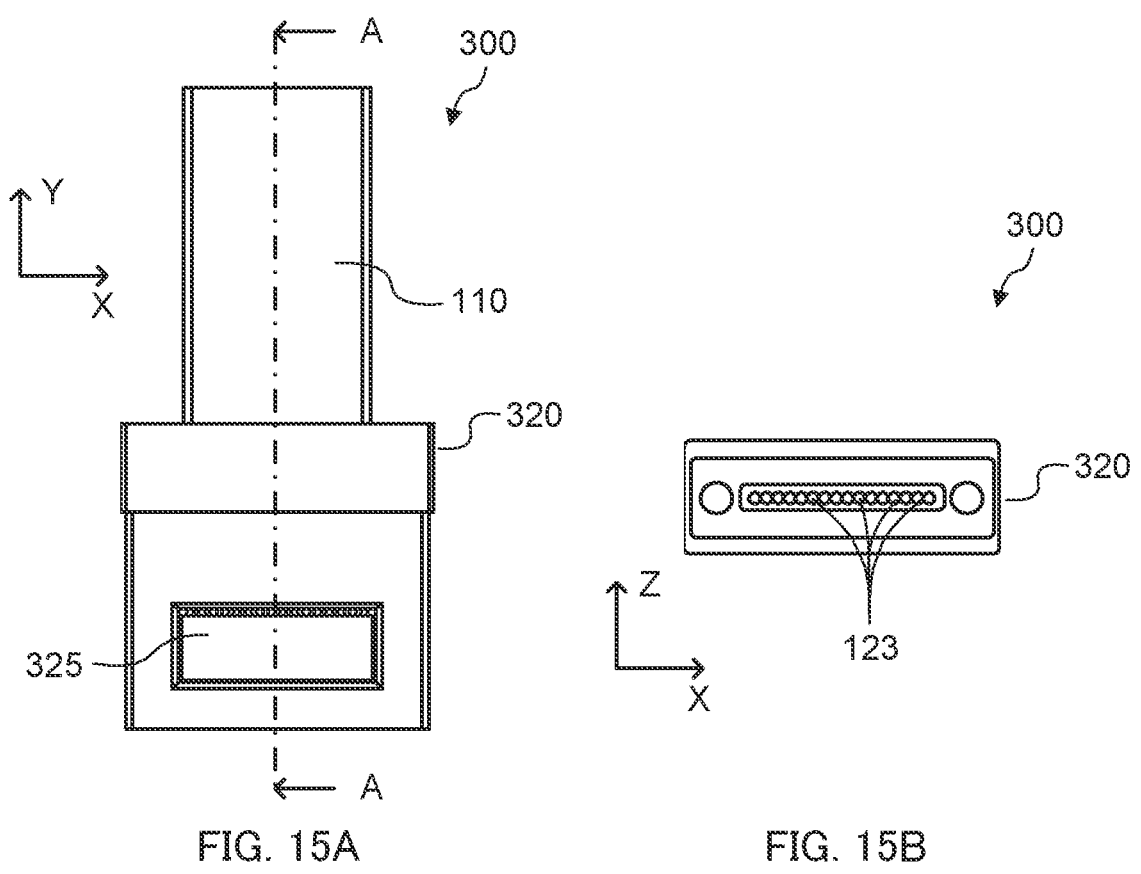
Figure 15C:
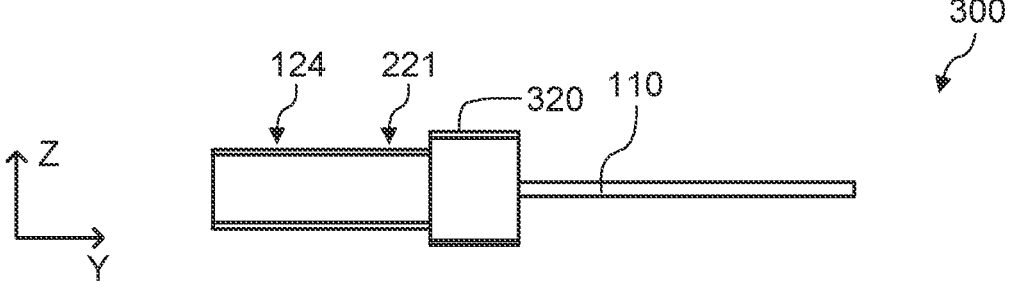
Figure 15D:
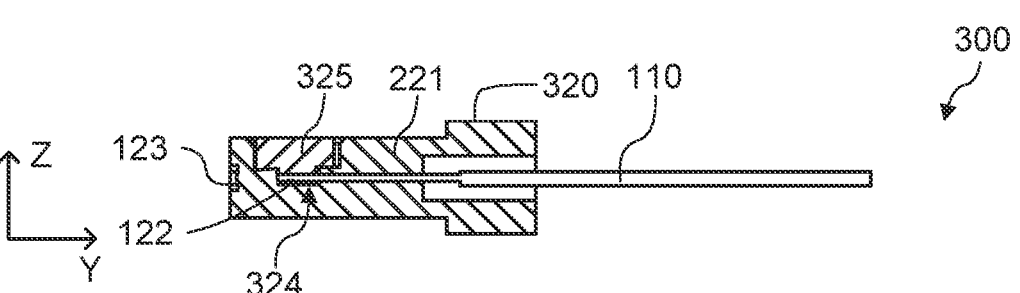

15A is a plan view, FIG. 15B is a front view, FIG. 15C is a right side view, and FIG. 15D is a cross-sectional view taken along line A-A in FIG. 15A all illustrating optical connector 300.

As illustrated in FIGS. 14 and 15A to 15D, optical connector 300 according to Embodiment 3 includes optical transmission members 110 and ferrule 320. Optical connector 300 according to the present embodiment can be used as an optical connector module (not illustrated) together with another component such as a housing and a spring clamp structure.

Configuration of Ferrule

Figures 17A, 17B, 17C, 17D:
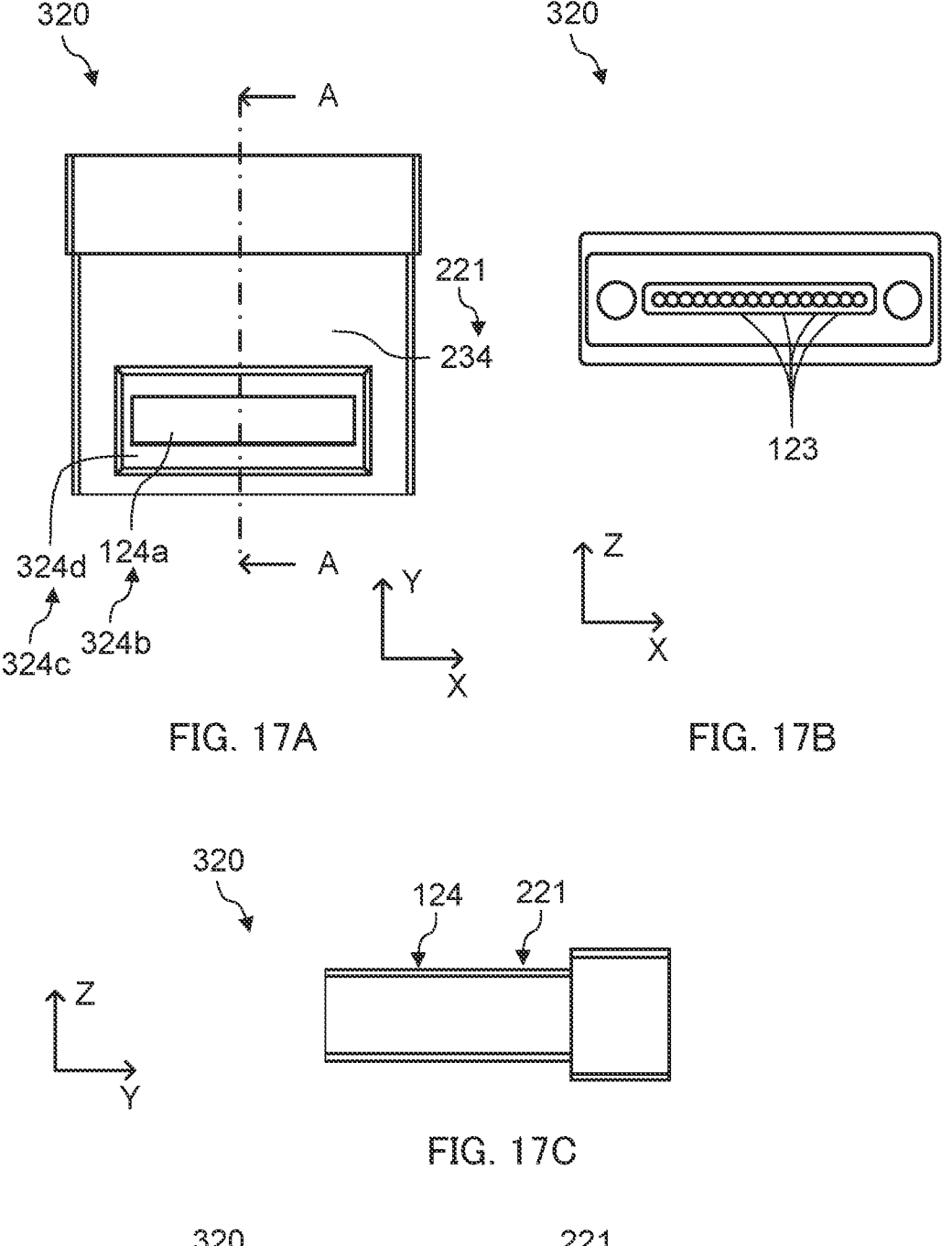

FIGS. 16A, 16B, and 17A to 17D illustrate the configuration of ferrule 320, from which lid 325 is removed, according to Embodiment 3 of the present invention. FIG. 16A is a perspective view of ferrule 320 viewed from the front side, and FIG. 16B is a perspective view of ferrule 320 viewed from the rear side. FIG. 17A is a plan view, FIG. 17B is a front view, FIG. 17C is a right side view, and FIG. 17D is a cross-sectional view taken along line A-A in FIG. 17A all illustrating ferrule 320.

As illustrated in FIGS. 16A, 16B, and 17A to 17D, ferrule 320 includes alignment part 221, a plurality of first surfaces 122, a plurality of second surfaces 123, fixing recess (recess) 324, and lid 325 (see FIG. 18). First surface 122 and second surface 123 are the same as those of Embodiment 1, and alignment part 221 is the same as that of Embodiment 2; thus the descriptions thereof will be omitted.

Fixing recess 324 is filled with adhesive G while the end portions of the plurality of optical transmission members 110 are disposed in the fixing recess. Fixing recess 324 is formed to have a depth such that when optical transmission members 110 are aligned by alignment part 221, optical transmission members 110 do not contact bottom surface 124a of fixing recess 324. Fixing recess 324 includes first recess 324b and second recess 324c.

First recess 324b is disposed on the back surface side of ferrule 320. The end portions of the plurality of optical transmission members 110 are disposed in first recess 324b, and a portion of lid 325 is housed in the first recess. First recess 324b opens to the bottom portion of second recess 324c.

Second recess 324c is disposed on the top surface side of ferrule 320. A portion of lid 325 is housed in second recess 324c. To the bottom portion of second recess 324c, first recess 324b opens. The bottom surface of second recess 324c is first contact surface 324d for contacting second contact surface 325g of lid 325 and supporting lid 325.

First contact surface 324d is a flat surface inclined with respect to the straight line along the second direction (Y direction). In the present embodiment, first contact surface 324d is inclined so as to approach second surface 123 as the first contact surface approaches the back surface of ferrule 120. The inclination angle of first contact surface 324d is not limited. When pressing surface 125a is required to move up and down by a large amount, the inclination angle of first contact surface 324d may be increased. On the other hand, when pressing surface 125a is required to move up and down by a small amount, the inclination angle of first contact surface 324d may be reduced. The inclination angle of first contact surface 324d is in the range of 0.1° to 10°. In the present embodiment, the inclination angle of first contact surface 324d is 2°.

FIG. 18A is a plan view, FIG. 18B is a bottom view, FIG. 18C is a front view, and FIG. 18D is a right side view all illustrating lid 325.

As illustrated in FIGS. 18A to 18D, lid 325 presses the plurality of optical transmission members 110 and adjusts the height of the end surfaces of the plurality of optical transmission members 110. At least a portion of lid 325 is configured to be housed in fixing recess 324. In the present embodiment, lid 325 includes first lid 325e and second lid 325f. First lid 325e includes pressing surface 125a configured to press optical transmission members 110. Second lid 325f includes pressed surface 125b configured to be pressed by an external device. Second lid 325f is formed to have a shape larger than that of first lid 325e in plan view. The lower surface of second lid 325f is second contact surface 325g configured to contact first contact surface 324d of fixing recess 324.

Second contact surface 325g is a flat surface inclined with respect to pressing surface 125a. In the present embodiment, in a state where lid 325 is housed in fixing recess 324, second contact surface 325g is inclined so as to approach second surface 123 as the second contact surface approaches the back surface of ferrule 120. The inclination angle of second contact surface 325g is not limited. When pressing surface 125a is required to move up and down by a large amount, the inclination angle of second contact surface 325g may be increased. On the other hand, when pressing surface 125a is required to move up and down by a small amount, the inclination angle of second contact surface 325g may be reduced. The inclination angle of second contact surface 325g with respect to pressing surface 125a is in the range of 0.10 to 10°. In the present embodiment, the inclination angle is 2°, which is the same as that of first contact surface 324d.

FIG. 19 is a diagram for explaining the method for producing optical connector 300 according to Embodiment 3. As illustrated in FIG. 19, in the method for producing optical connector 300 according to the present embodiment, the positions of the end surfaces of optical transmission members 110 are adjusted by sliding lid 325 in the second direction (Y direction). Specifically, when lid 325 is moved in the second direction (Y direction: to the right side in FIG. 19), pressing surface 125a moves upward. On the other hand, when lid 325 is moved in the second direction (Y direction: to the left side in FIG. 19), pressing surface 125a moves downward. In this manner, the positions of the plurality of optical transmission members 110 are adjusted so that the end surfaces of optical transmission members 110 face corresponding first surfaces 122.

Effects

Optical connector 300 according to the present embodiment has the same effects as optical connector 100 of Embodiment 1 and optical connector 200 of Embodiment 2. In addition, in optical connector 300 according to the present embodiment, second contact surface 325g is inclined with respect to pressing surface 125a; therefore, the positions of the end surfaces of optical transmission members 110 can be adjusted simply by sliding lid 325.

Lid 225 including second grooves 225d may be used in Embodiment 1, or lid 125 including no second groove 225d may be used in Embodiment 2.

Embodiment 4

In the following, an optical connector according to Embodiment 4 will be described. In the optical connector according to the present embodiment, both the first surface (for example, top surface) of a ferrule and the second surface (for example, back surface) of the ferrule respectively fix optical transmission members. Herein, the optical connector according to the present embodiment is not particularly illustrated.

In the optical connector according to the present embodiment, two sets of optical transmission members 110, two alignment parts 121, two sets of first surfaces 122, two sets of second surfaces 123, two recesses 124, and two lids 125 are disposed. One set of optical transmission members 110, one of alignment parts 121, one set of first surfaces 122, one set of second surfaces 123, one of recesses 124, and one of lids 125 are disposed on the first surface of the ferrule. Herein, the first surface means a surface that defines the outer shape of the ferrule. In the present embodiment, the first surface is a top surface. The other set of optical transmission members 110, the other one of alignment parts 121, the other set of first surfaces 122, the other set of second surfaces 123, the other one of recesses 124, and the other one of lids 125 are disposed on the second surface opposite to the first surface in the ferrule. Herein, the second surface is a surface disposed on the side opposite to the first surface.

In the present embodiment, the one of each set of the components, namely optical transmission members 110, alignment part 121, first surfaces 122, second surfaces 123, recess 124, and lid 125, is the same as the corresponding component of optical connector 100 in Embodiment 1. The other one of each set of the components, namely optical transmission members 110, alignment part 121, first surfaces 122, second surfaces 123, recess 124, and lid 125, is also the same as the corresponding component of optical connector 100 in Embodiment 1. Each component of optical connector 200 in Embodiment 2 may be used, or each component of optical connector 300 in Embodiment 3 may be used.

INDUSTRIAL APPLICABILITY

The optical connectors and optical connector modules according to the present invention are advantageous for optical communications using optical transmission members.

REFERENCE SIGNS LIST 100, 200, 300 Optical connector
110 Optical transmission member
120, 220, 320 Ferrule
121, 221 Alignment part
122 First surface
123 Second surface
124, 324 Fixing recess (recess)
124a Bottom surface
125, 225, 325 Lid
125a Pressing surface
125b Pressed surface
125c Side surface
131 Alignment recess
132 First groove
133 Fixing member
133a Fixing member main body
133b Pressing part
133c Engaging hole
133d Engaging projection
225d Second groove
234 Wall
235 Through hole 324b First recess
324c Second recess
324d First contact surface
325e First lid
325f Second lid
325g Second contact surface
G Adhesive

What is claimed is:

1. An optical connector, comprising:
a plurality of optical transmission members; and a ferrule configured to hold the plurality of optical transmission members,
wherein the ferrule includes:
an alignment part for aligning the plurality of optical transmission members in a first direction,
a first surface disposed to face an end surface of the plurality of optical transmission members aligned by the alignment part, the first surface being for allowing incidence of light emitted from the plurality of optical transmission members or allowing emission of light traveling inside the optical connector to an outside,
a second surface for allowing emission of the light incident on the first surface to the outside or allowing incidence of light from the outside,
a recess that is disposed between the alignment part and the first surface and includes a non-contact region corresponding to an end portion of the plurality of optical transmission members aligned by the alignment part, the recess being a recess in which the plurality of optical transmission members are disposed without contacting the non-contact region, and
a lid for adjusting a position of the end surface of the plurality of the optical transmission members with respect to the first surface by pressing the plurality of optical transmission members by using a pressing surface of the lid, the pressing surface being configured to contact the plurality of the optical transmission members,
wherein a region of the pressing surface is smaller than a region of the non-contact region in plan view, and
wherein a plurality of the first surfaces are disposed on an inner surface of the recess.

2. The optical connector according to claim 1, wherein a distance between an outer edge of the pressing surface of the lid and a portion of an inner surface of the recess is 0.1 mm or more, the portion and the pressing surface being located at an identical height.

3. The optical connector according to claim 1, wherein a plurality of grooves for aligning the plurality of optical transmission members are disposed on the pressing surface.

4. The optical connector according to claim 1, wherein, in the lid, the pressing surface and a pressed surface disposed on a side opposite to the pressing surface are parallel to each other, the pressed surface being configured to be pressed by an external device.

5. The optical connector according to claim 1, wherein:
two of the optical transmission members, two of the alignment parts, two of the first surfaces, two of the second surfaces, two of the recesses, and two of the lids are disposed;
one of the optical transmission members, one of the alignment parts, one of the first surfaces, one of the second surfaces, one of the recesses, and one of the lids are disposed on a first surface of the ferrule; and
the other one of the optical transmission members, the other one of the alignment parts, the other one of the first surfaces, the other one of the second surfaces, the other one of the recesses, and the other one of the lids are disposed on a second surface of the ferrule, the second surface being located on a side opposite to the first surface of the ferrule.

6. An optical connector module, comprising the optical connector according to claim 1.

7. The optical connector according to claim 1, wherein the lid is smaller than the recess in plan view.

8. The optical connector according to claim 1, wherein a bottom surface of the recess is a flat surface.

9. The optical connector according to claim 1, further comprising an adhesive disposed in the recess.

10. A method for producing an optical connector that is the optical connector according to claim 1, the method comprising:

aligning the plurality of optical transmission members in the first direction by the alignment part while the end portion of the plurality of optical transmission members is disposed in the recess;

filling the recess with an adhesive;

disposing the lid in the recess, in which the end portion of the plurality of optical transmission members is disposed;

adjusting a position of the end surface of the plurality of the optical transmission members by pressing the lid toward the plurality of optical transmission members so that light emitted from the end surface of the plurality of optical transmission members is incident on a plurality of the first surfaces, or light emitted from the plurality of first surfaces is incident on the end surface of the plurality of optical transmission members; and fixing the position of the end surface of the plurality of optical transmission members by curing the adhesive, the position having been adjusted.

11. An optical connector, comprising:

a plurality of optical transmission members; and a ferrule configured to hold the plurality of optical transmission members, wherein the ferrule includes:

an alignment part for aligning the plurality of optical transmission members in a first direction, a first surface disposed to face an end surface of the plurality of optical transmission members aligned by the alignment part, the first surface being for allowing incidence of light emitted from the plurality of optical transmission members or allowing emission of light traveling inside the optical connector to an outside, a second surface for allowing emission of the light incident on the first surface to the outside or allowing incidence of light from the outside, a recess that is disposed between the alignment part and the first surface and includes a non-contact region corresponding to an end portion of the plurality of optical transmission members aligned by the alignment part, the recess being a recess in which the plurality of optical transmission members are disposed without contacting the non-contact region, and a lid for adjusting a position of the end surface of the plurality of the optical transmission members with respect to the first surface by pressing the plurality of optical transmission members by using a pressing surface of the lid, the pressing surface being configured to contact the plurality of the optical transmission members, wherein a region of the pressing surface is smaller than a region of the non-contact region in plan view, and wherein:

the recess includes a first contact surface that is a flat surface for supporting the lid;

the lid includes a second contact surface that is a flat surface for contacting the first contact surface; and the pressing surface is inclined with respect to the second contact surface.

12. An optical connector, comprising:

a plurality of optical transmission members; and a ferrule configured to hold the plurality of optical transmission members, wherein the ferrule includes an alignment part for aligning the plurality of optical transmission members in a first direction, a first surface disposed to face an end surface of the plurality of optical transmission members aligned by the alignment part, the first surface being for allowing incidence of light emitted from the plurality of optical transmission members or allowing emission of light traveling Inside the optical connector to an outside, a second surface for allowing emission of the light incident on the first surface to the outside or allowing incidence of light from the outside, a recess that is disposed between the alignment part and the first surface and includes a non-contact region corresponding to an end portion of the plurality of optical transmission members aligned by the alignment part, the recess being a recess in which the plurality of optical transmission members are disposed without contacting the non-contact region, and a lid for adjusting a position of the end surface of the plurality of the optical transmission members with respect to the first surface by pressing the plurality of optical transmission members by using a pressing surface of the lid, the pressing surface being configured to contact the plurality of the optical transmission members, wherein a region of the pressing surface is smaller than a region of the non-contact region in plan view, and wherein each of a plurality of the end surfaces of the plurality of optical transmission members is separated from the corresponding one of a plurality of the first surfaces.

* * * * *